US010402068B1

(12) United States Patent
Dodge et al.

(10) Patent No.: US 10,402,068 B1
(45) Date of Patent: Sep. 3, 2019

(54) FILM STRIP INTERFACE FOR INTERACTIVE CONTENT

(71) Applicant: Amazon Technologies, Inc., Seattle, WA (US)

(72) Inventors: Michael L S Dodge, Seattle, WA (US); Charles Shearer Dorner, Seattle, WA (US); Janet Ellen Galore, Seattle, WA (US); Zakaria David Zajac, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 389 days.

(21) Appl. No.: 15/184,790

(22) Filed: Jun. 16, 2016

(51) Int. Cl.
| | | |
|---|---|---|
| *G06F 3/0484* | (2013.01) |
| *G06F 3/0482* | (2013.01) |
| *G09G 5/00* | (2006.01) |
| *G06Q 30/06* | (2012.01) |

(52) U.S. Cl.
CPC ........ *G06F 3/04845* (2013.01); *G06F 3/0482* (2013.01); *G06Q 30/0603* (2013.01); *G06Q 30/0625* (2013.01); *G06Q 30/0643* (2013.01); *G09G 5/005* (2013.01); *G06F 2203/04803* (2013.01)

(58) Field of Classification Search
CPC .. G06F 3/04845; G06F 3/0482; G06F 3/0485; G06F 2203/04803; G06G 30/0603; G06Q 30/0643; G06Q 30/0625; G06Q 30/0603; G09G 5/005
See application file for complete search history.

(56) References Cited

U.S. PATENT DOCUMENTS

| | | | |
|---|---|---|---|
| 6,288,702 B1* | 9/2001 | Tachibana | G06F 3/0481 345/671 |
| 6,307,568 B1 | 10/2001 | Rom | |
| 6,564,118 B1 | 5/2003 | Swab | |
| 6,577,304 B1* | 6/2003 | Yablonski | G06F 3/04815 345/419 |
| 6,901,379 B1 | 5/2005 | Balter et al. | |
| 7,472,077 B2 | 12/2008 | Roseman et al. | |
| 7,685,074 B2 | 3/2010 | Linden et al. | |
| 8,121,900 B1* | 2/2012 | Gulten | G06Q 30/0643 705/26.1 |
| 8,122,020 B1 | 2/2012 | Donsbach et al. | |
| 8,275,590 B2 | 9/2012 | Szymczyk et al. | |
| 8,780,108 B2 | 7/2014 | Ellens et al. | |
| 8,990,215 B1 | 3/2015 | Reztleff, II et al. | |
| 9,075,492 B1* | 7/2015 | Scott | G06F 3/048 |
| 9,087,395 B1 | 7/2015 | Amacker | |
| 9,270,940 B1 | 2/2016 | Aravkin et al. | |
| 9,779,447 B2 | 10/2017 | Paolini | |
| 9,984,409 B2 | 5/2018 | Naware et al. | |

(Continued)

*Primary Examiner* — Ajay M Bhatia
*Assistant Examiner* — Mong-Shune Chung
(74) *Attorney, Agent, or Firm* — Knobbe, Martens, Olson & Bear, LLP

(57) ABSTRACT

Features are disclosed for dynamically generating a navigation interface for rendering content related to an item. To generate the interface, the system analyzes the content available and organizes the content in an intuitive way that keeps the user oriented as they explore the product. Some aspects also consider the access device rendering the interface to ensure the interface includes content that is appropriately selected and formatted for presentation via the access device.

20 Claims, 17 Drawing Sheets

(56) References Cited

U.S. PATENT DOCUMENTS

| | | |
|---|---|---|
| 10,089,680 B2 | 10/2018 | Lin et al. |
| 2001/0026272 A1 | 10/2001 | Feld et al. |
| 2002/0082953 A1 | 6/2002 | Batham et al. |
| 2005/0131571 A1 | 6/2005 | Costin |
| 2006/0015208 A1 | 1/2006 | Reyes Moreno |
| 2006/0291738 A1* | 12/2006 | Gong .................. G06T 3/40 382/254 |
| 2007/0130020 A1 | 6/2007 | Paolini |
| 2008/0122796 A1 | 5/2008 | Jobs et al. |
| 2009/0222127 A1 | 9/2009 | Lind |
| 2012/0191577 A1* | 7/2012 | Gonsalves ......... G06Q 30/0601 705/27.2 |
| 2012/0246588 A1* | 9/2012 | Petersen ............... G06Q 30/02 715/769 |
| 2012/0296739 A1* | 11/2012 | Cassidy ................ G06Q 30/02 705/14.51 |
| 2013/0215116 A1 | 8/2013 | Siddique et al. |
| 2013/0283301 A1 | 10/2013 | Avedissian |
| 2013/0311875 A1* | 11/2013 | Pappas ............... G06F 17/2247 715/234 |
| 2014/0333614 A1 | 11/2014 | Black et al. |
| 2015/0012426 A1 | 1/2015 | Purves et al. |
| 2015/0055085 A1 | 2/2015 | Fonte et al. |
| 2015/0220244 A1* | 8/2015 | Vats ................... G06F 3/04815 715/850 |
| 2016/0092592 A1* | 3/2016 | Bates ................ G06Q 30/0601 715/240 |
| 2016/0210602 A1 | 7/2016 | Siddique et al. |

\* cited by examiner

FILM STRIP INTERFACE FOR INTERACTIVE CONTENT

BACKGROUND

Retailers, merchants, sellers, manufacturers, stylists, designers, and others may provide or promote user interfaces to enable a user browse items included in an electronic catalog and/or search an electronic catalog for items available for purchase or other acquisition. For example, the user may browse or scroll through a grid or list of items. Content may be provided for the items to help describe or illustrate features of the item. One example of content that may be provided is an image of the item. The image may show the entire item or a portion of the item. By including several images of the item different perspectives of the item may be presented. For example, for a clothing item, it may be desirable to include a first image showing the one side of the item, a second image showing the reverse side of the item, and a third image showing the label for the clothing item. In presenting these different images, however, there exists a problem in maintaining context between the views presented in each image and how the views are related.

BRIEF DESCRIPTION OF THE DRAWINGS

Embodiments of various inventive features will now be described with reference to the following drawings. Throughout the drawings, the examples shown may re-use reference numbers to indicate correspondence between referenced elements. The drawings are provided to illustrate example embodiments described herein and are not intended to limit the scope of the disclosure.

DETAILED DESCRIPTION

Figure 1:
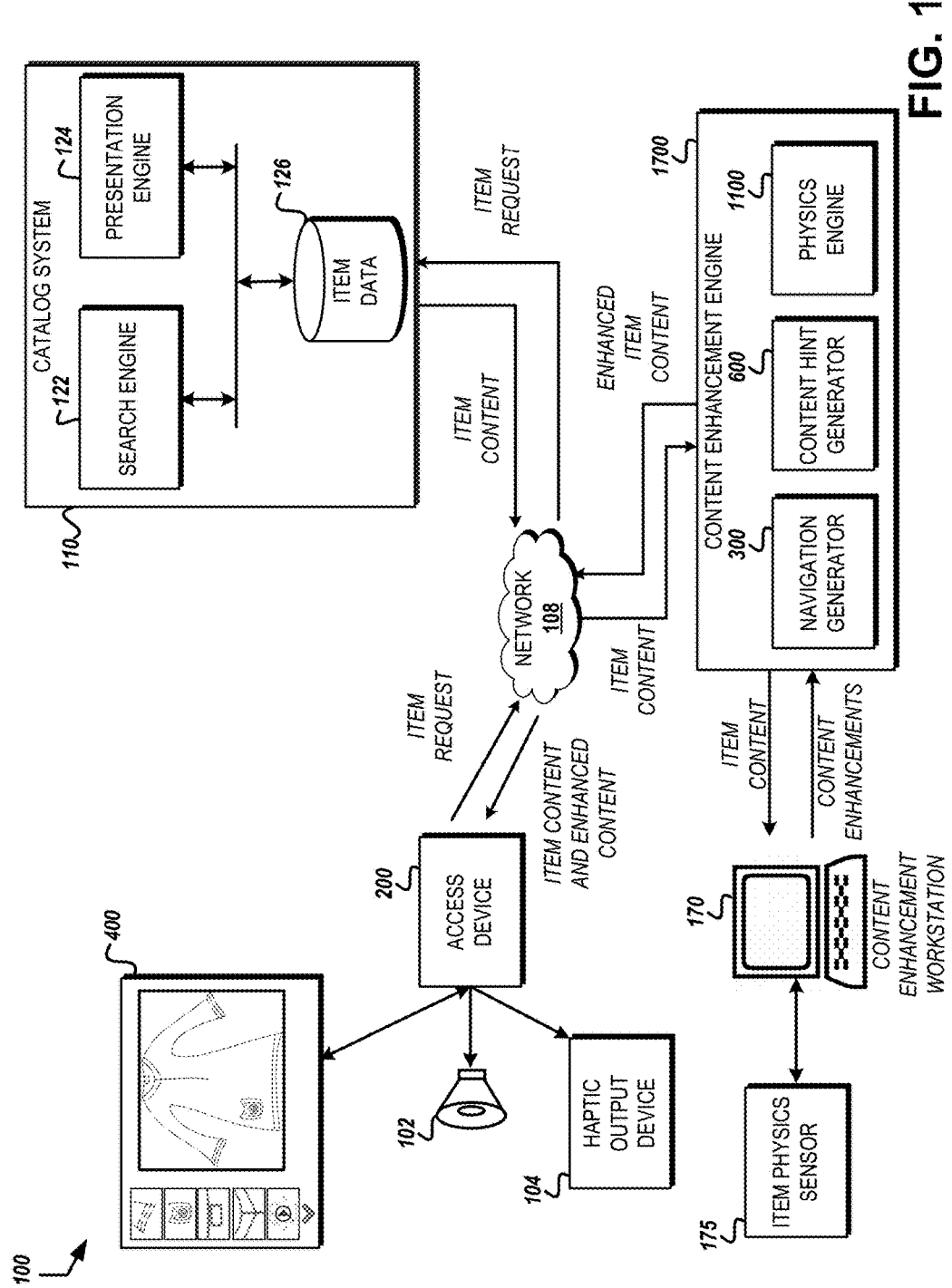
FIG. 1 is a pictorial diagram depicting an illustrative environment in which a content enhancement engine is used to augment content describing an item that is accessed from a catalog system using an access device.

An item may be described using different types of content such as image, video, audio, or text. Textual content may include descriptions of the item for display. Video content may include a series of images demonstrating a feature of the item. For example, for a kitchen gadget, it may be desirable to show a video of a person using the gadget. The video may include audio coordinated for playback with the series of images. For some items, the audio content may include a recording of an oral description of the item or its features. For some items, the audio content may include a recording of a sound the item makes. For example, an alarm clock may have audio content of the alarm sound emitted by the alarm clock.

Content for items is typically shown via a display of a computing device such as a smartphone, tablet computer, laptop, or desktop computer. However, the display and/or computing device may be limited in the ways in which the item can be described. Providing an accurate representation of the item can thus be hindered by the limitations in the display capabilities of the device. For example, the contextual relationship between content elements can be lost or obscured. Consider the relationship between an overview image of an item and a detailed image of the item. For intricate items, such as a rug, it may be difficult to understand what part of the rug is shown in the detailed view. Hinting, as described below, may be included to associate the detailed content with a location (e.g., region) within the overview image.

Furthermore, in some implementations, content may be received from multiple sources. For example, users may provide different content for an item. Some content may show the item from the same or similar perspective, while other content may show unique features of the item. In a limited resource environment (e.g., a mobile device, small form factor device, etc.), it may be desirable to dynamically identify the content and layout of content be displayed. This can provide the appropriate content in a contextually appropriate way to a user that accurately and efficiently describes the item.

Such interfaces may be considered enhanced content because the content elements are augmented through the dynamic generation of the presentation of content showing the item. Enhanced content may refer to interactive content that provide descriptive information about an item. The enhanced content may include an aggregation of content elements that are coordinated in time and/or space to provide a unified representation of the item. In some instances, the enhanced nature of the content may not be apparent when accessing the enhanced content via a computing device. For example, which locations of the enhanced content that may be interactive may not be readily apparent. Furthermore, the ways in which the enhanced content may be interacted with may not be apparent. Accordingly, it may be desirable to process enhanced content to provide guidance (e.g., hints) as to how to interact with the enhanced content. One enhancement to the content may be dynamically providing an interface for navigating the content available for an item. For example, images showing a detailed view of an item may be dynamically selected and mapped to a location or region in an overview image to indicate which portion of the overview image the detailed view is showing and to indicate in the overview image, which locations have detailed views available.

Enhanced content may also include enhancing existing content such as video or audio content to include interactive descriptive information. For example, video content may be enhanced to respond to user interactions (e.g., touch, sound, breath, or other input) with the display showing the enhanced content to simulate a physics property of the item. For example, if a user is moving their finger on enhanced video content of a zipper being zipped to move the zipper head, playback of audio and haptics (using for example, the actuator or vibration motor in a phone) to correspond of the sound and vibration of the teeth as the zipper is pulled may be controlled. The enhanced content may include generating a physics model to correlate the interactions of the user (e.g., finger movements) in time or space with the playback of audio, video, haptics or other responses.

The features described provide a non-limiting advantage of enhancing the presentation of an item on a display so as to provide a realistic and accurate representation of the item. Rather than simply presenting one image of an item, images, videos, and enhanced content may be presented. For example, a first image showing the item may be presented in a main viewing portion on a display, and a film strip of thumbnail images may be rendered near the main viewing area. The thumbnail images may represent previews of other content (e.g., other images, videos, audio, or enhanced content) available for display. The film strip can include a central frame, and the thumbnail images can be moved relative to the central frame in response to an interaction with the film strip. One example of an interaction with the film strip is dragging the film strip back and forth while the central frame remains fixed in order to position any one of the thumbnail images within the central frame.

In addition to providing previews of content available for display for a given item, if a thumbnail represents a point of interest within the image shown in the main viewing portion, an area surrounding the point of interest can be noted on the image shown in the main viewing portion. When the thumbnail corresponding to one of these points of interest is within the frame of the film strip, the corresponding area in the main image can be highlighted to indicate which point of interest is in focus. Further, a visual or animated hint can be displayed within the highlighted area when the corresponding thumbnail is in focus to provide an indication of the point of interest shown in the thumbnail and/or that the type of content associated with the thumbnail is enhanced content. This helps orient and relate different content showing the item represented in the film strip to the content shown in the main viewing portion.

If a user selects a thumbnail (e.g., by touch or click), the content corresponding to the thumbnail can be presented in the main viewing portion. Depending on a content type (e.g., image content, video content, textual content, audio content, enhanced content), presentation in the main viewing portion may include initiating playback of the content corresponding to the selected thumbnail (such as by playing video or audio content). As the content corresponding to the selected thumbnail comes into focus in the main viewing portion, the presentation may include zooming into the point of interest within the main viewing portion. This highlights the region of the content corresponding to the selected thumbnail relative to the content previously shown in the main viewing portion and helps maintain context for overall item review.

The selected content may show a detailed portion of the item. After viewing content showing a detailed portion of the item, a user may wish to return to content showing an overview of the item. This may be accomplished by detecting a selection of a thumbnail corresponding to the content showing the overview of the item from the film strip. Alternatively, a control element may be provided such as a back-arrow. If the control element is activated, the content showing the overview of the item may be presented in the main viewing portion, replacing the content showing a detailed portion of the item. The presentation may include zooming out from the point of interest shown in the content showing a detailed portion of the item to the content showing the overview of the item. This again maintains a navigational context for the interface and orients the user to the features of the item as illustrated in the content showing the detailed portion of the item and the content showing the overview of the item in a more realistic and intuitive way.

Content showing the item may be enhanced content. Content identified as enhanced content may be configured to respond to a detected interaction. For example, the functioning of a zipper on a garment may be demonstrated using interactive content. In such an interactive content, a series of images (e.g., video) of the zipping action may be captured. The frames of the image may be mapped to an interaction with the zipper such that if a user selects the zipper tab and then drags along the zipper, the images shown correlate to the unzipped state of the garment.

For a given item, it may not be readily apparent which content is enhanced content or in what ways a user can interact with enhanced content. The enhanced content may be dynamically augmented with hints for presentation to a user. The hints may identify the content as enhanced content and suggest how the enhanced content may be activated and/or interacted with. The introduction of hints into an initial preview of content may suggest the presence of enhanced content upon user interaction. The hints may be presented to show a user what action they can take to further explore the content, and/or a preview of what will happen if they do.

Hints can be auditory or visual "veils." With a veil, a shadow may be displayed that passes across the image to hint at an action that can be made by user interaction. With a "ghost," a ghost image/video may be presented to preview what will happen when you interact with the image. In some implementations, a combination of each of these hints may be included based on the desired description of the item needed, the access device capabilities for displaying the hints, and/or the user of the access device's ability to perceive the hints (e.g., due to visual impairments, color vision impairment, hearing impairment).

Enhanced content can respond to the user's touch, sound, breath, or other input while the digital representation of the item is being handled, or after the user releases the interaction. For example, if a user is moving their finger on a video of a zipper being zipped to move the zipper head, playback of audio and haptics (using for example, the actuator or vibration motor in a phone) to correspond of the sound and vibration of the teeth as the zipper is pulled may be controlled. Sound, haptics, or visual hints can be included in a physics model of the item to mimic the feel of the zipper, and if it catches on the fabric, or is difficult to pull. Physics can also be mimicked when the user lifts their finger/mouse from one of interactions to increase realism. With the zipper example, if the user lifts their finger after sliding it partially across the span of movement, the video is paused at the corresponding frame, displaying the zipper half-open. This simulates the physical property of isotonicity for the item.

In different situations, e.g., when a user uses fingers to manipulate enhanced video content demonstrating the elasticity of a fabric, when the user releases their engagement with the enhanced video content, the video plays back to the original frame, providing a simulation of the fabric's shape returning to the unstretched state. This simulates the physical property of elasticity for the item.

These simulated isotonic or elastic reactions can be mapped closely to the physical properties of the material or situation through generative processes or through capture methods. For example, in a video where a hand moves across the bristles of a brush, the audio waveform can be used as a proxy for a haptic response corresponding to the 'feel' of the bristles. As each bristle is engaged, the waveform of the audio is transformed to a corresponding pulse to the vibration motor of the phone, which makes it "feel" as if the bristles are being stroked.

The physics modeling feature provide a mapping of the real-world interaction response to a digital proxy, which a user's brain "fills in" via mirror neurons or vicarious observation to provide a more immersive experience of the item.

FIG. 1 is a pictorial diagram depicting an illustrative environment 100 in which a content enhancement engine 1700 is used to augment content describing an item that is accessed from a catalog system 110 using an access device 200. The environment 100 shown in FIG. 1 includes an access device 200. The access device 200 may be configured to exchange messages with the catalog system 110. The messages may include queries for items or requests for content for an item. The access device 200 may be implemented as an appliance, a video conferencing system, personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), a combination of one or more of the foregoing, or some other electronic device or appliance. The access device 200 may transmit messages to and receive messages from the catalog system 110 and/or the content enhancement engine 1700. The messages may be formatted according to a standardized protocol such as TCP/IP, HTTP, FTP, or the like. The transmission may be sent wired, wireless, or hybrid wired-wireless networks.

The access device 200 may be configured to provide a display 400 of content received from the catalog system 110 or from the content enhancement engine 1700. In some implementations, the display 400 may be an interactive display such as a touchscreen or a display coupled with an input device such as a mouse, keyboard, stylus, or the like. In such implementations, the display 400 may also detect interactions at one or more points on the display 400. An interaction may include location information indicating where the interaction was detected. An interaction may include an interaction type such as a click, double-click, identification of which button was clicked, a tap, a gesture, etc. An interaction may also include a direction. For example, a user may click and drag from left to right on the display 400. In such implementations, the interaction may include information indicating left to right movement for the interaction. An interaction may also include a magnitude indicating an amount of interaction. For example, when the interaction is a swipe, the magnitude as indicated by the length of the swipe may be measured and provided as part of the interaction detection. As another example, the magnitude may be measured based on how quickly the swipe is made or how much pressure was applied during the swipe. It will be appreciated that the magnitude may be detected using a composite of one or more of direction, speed, pressure, and duration of interaction.

The access device 200 may be configured to provide other types of output than visual output. As shown in FIG. 1, the access device 200 may be coupled with an audio output device 102. The audio output device 102 may be implemented as a speaker. The audio output device 102 may be configured to play sounds included in the item content. For example, if the item is an alarm clock, it may be desirable to provide users access to an audio content representing the sound of the alarm. As another example, if the content is video content, there may be both an audio and visual content. The audio output device 102 may be used to present the audio portion of the video content.

Another type of output the access device 200 may provide is haptic feedback. As shown in FIG. 1, the access device 200 may be coupled with a haptic output device 104. The haptic output device 104 may provide tactile feedback such as vibrations to a user of the access device 200. One example of a haptic output device 104 is a rotary vibrator. The haptic output device 104 may be configured to provide varying degrees of vibrations (e.g., over a range of frequencies and/or intensities) based on information provided by the access device 200. Other output devices that may be coupled or integrated with the access device 200 include an augmented or virtual reality device (e.g., goggles), a tele-immersion device, or smell generator. In some implementations, the output devices may be included within a physical item such as a chair, dashboard, desk, bed, or pillow.

The access device 200 may also communicate via the network 108 with a catalog system 110. The catalog system 110 may be included to provide a central repository of items that can be accessed by a user. The catalog system 110 may provide functionality for users to, e.g., interactively browse, search for, review, rate, tag, purchase, and sell catalog items such as appliances, electronics, books, clothing, jewelry, and the like. Examples of such systems are described in greater detail, e.g., in U.S. Pat. Nos. 7,685,074; 7,472,077; and 8,122,020, each of which is incorporated herein by reference in its entirety.

The access device 200 may be configured to request information from the catalog system 110. For example, the access device 200 may submit a query to the catalog system 110. A search engine 122 may process the query to identify items and/or content describing an item from an item data store 126. The identification may be a literal identification (e.g., exact match between item data and the item search request). The identification may be a partial match (e.g., words with similar stems or synonyms matching). In some implementations, the search may be executed against an index of the item data store 130.

The catalog system 110 may also include a presentation engine 124. The presentation engine 124 may be configured to present items included in the item data storage 126 based on information included in the item request. In some implementations, the catalog system 110 and the access device 200 may establish a session. A session generally refers to a series of queries and responses between the catalog system 110 and the access device 200. The session can provide implicit information for an item request. For example, if two item queries for strategy board games are received by the catalog system 110 during a session, it can be inferred that the category of items the user is looking for is games. This information can be used to augment queries at the search engine 122 such as by adding the implicitly identified criteria to searches. This information can be used to filter or organize items for presentation by the presentation engine 124. For example, if items in the category of board games were returned for a first search, a second search for "hammer of the scots" would rank board game related items more highly than books or movies with the same or similar title. The augmentation may also exclude items for a search from unrelated categories. Using the "hammer of the scots" example, items in the category of hardware may be excluded from the search. The relationship between categories may be identified using natural language models, dictionaries, or some combination thereof.

To improve the interface and provide a more realistic and accurate presentation of the item, the content enhancement engine 1700 may be included. As shown in FIG. 1, the content enhancement engine 1700 is a device in communication with the catalog system 110 and the access device 200 via the network 108. In some implementations, all or portions of the content enhancement engine 1700 may be implemented within the catalog system 110 or the access device 200. The content enhancement engine 1700 may receive content for an item to be enhanced. One enhancement may be to provide a navigation interface to present the content for an item in a contextually accurate way.

A navigation generator 300 may be included to analyze the content for an item and generate enhanced content including, for example, the navigation interface. Another enhancement may be to provide hints about content. A content hint generator 600 may be included to the type of content received from the catalog system 110 and identify relationships between the content. For example, a first content element may be an image showing a wristwatch and a second content element may be a video showing a close up of the watch face. The second content element is related to a portion of the wristwatch (e.g., the watch face) shown in the first content element. The hints can indicate interactive features for enhanced content or that additional content is available for a specific location of displayed content.

Another enhancement may be generating a physics model for content. The physics model may be generated to provide a representation of a physical characteristic of the item using image, sound, haptics, and/or other perceivable feedback presented via the access device 200. A physics engine 1100 may be included to generate one or more physics models for content. In some implementations, the physics engine 1100 may also tailor the model to the specific feedback elements (e.g., display, audio, haptic, etc.) for the access device that will render the enhanced content.

The system 100 may include a content enhancement workstation 170. The content enhancement workstation 170 may be configured to receive item content and acquire enhancements for the item content. For example, some features may not be detectable by the content enhancement engine 1700. Such features may include a physics property of an item, identifying the item represented by the item content, or interactive features of enhanced content. The content enhancement workstation may present an interface to receive annotation information for the item content such as areas of interest, features, or the like. The annotation information may be used by the content enhancement engine 1700 to process the item content (e.g., generate enhanced content).

In some implementations, the content enhancement workstation 170 may be coupled with an item physics sensor 175. As shown in FIG. 1, the content enhancement workstation 170 is coupled with one item physics sensor. In some implementations, it may be desirable to include more than one item physics sensor to collect different physics properties. The content enhancement workstation 170 may be configured to transmit control messages to the item physics sensor 175 to detect a physics property of an item. For example, the item physics sensor 175 may be implemented as a light detector. In such implementations, the light detector may be used to collect optical properties for an item such as absorbance, photosensitivity, reflectivity, refraction/refractive index, scattering, or transmittance. The sensing by the light detector may be controlled via a message transmitted from the content enhancement workstation 170 to the light detector. The message may include which optical properties to collect, a quality of light to detect (e.g., color, hue, brightness, etc.), or the format of the data collection (e.g., resolution for the detection, number of bits to use to represent the detected values, etc.). In some implementations, the item physics sensor 175 may be implemented as a magnetometer configured to detect magnetic properties of an item such as diamagnetism or magnetism. In some implementations, the item physics sensor 175 may be implemented as an acoustics sensor (e.g., microphone and audio analysis components) configured to detect acoustic properties of an item such as absorption, reflection, and amplification. In some implementations, the item physics sensor 175 may be implemented as a device or system configured to detect a physical property of the item such as elasticity, malleability (compression), ductility (stretching), strength (the opposite of deformability), stiffness/flexibility (bendability), viscosity (liquid flow), viscoelasticity (rubber bands/silicone products), or toughness (resistance to fracture). The item physics sensor 175 may be implemented as a device or system configured to sense thermal properties of an item such as boiling point, melting point, thermal expansion, emissivity, flammability, flash point, auto-ignition temperature, fire point, glass-transition temperature, heat capacity, or thermal conductivity.

While the access device 200, the content enhancement engine 1700, and the catalog system 110 are shown in FIG. 1 as separate entities configured to communicate via the network 108, in some implementations, it may be desirable to integrate two or more of the systems into a single system. For example, it may be desirable to include the content enhancement engine 1700 in the access device 200 or the catalog system 110.

Figure 2:
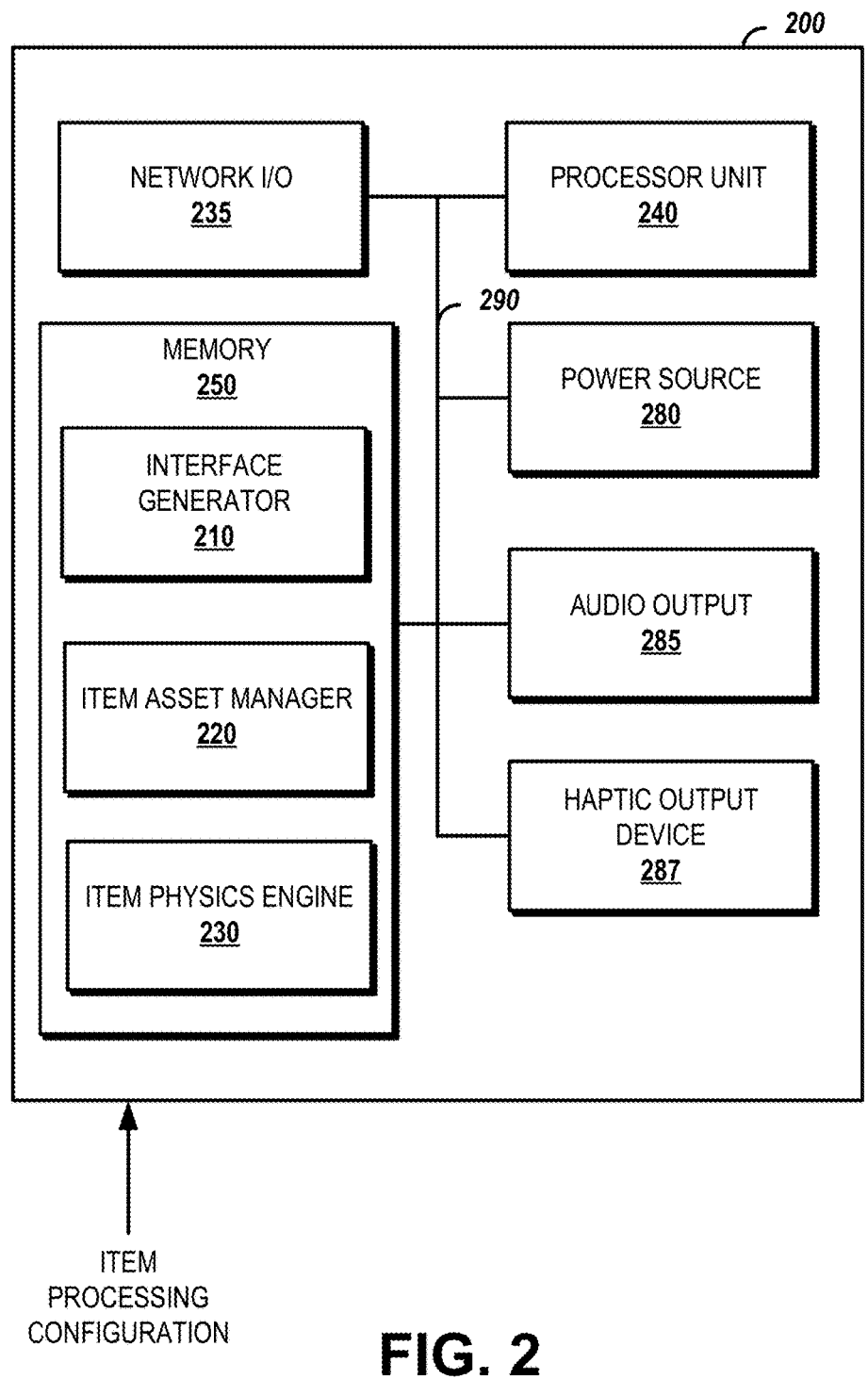
FIG. 2 is a block diagram depicting illustrative components of an embodiment of the access device shown in FIG. 1.

FIG. 2 is a block diagram depicting illustrative components of an embodiment of the access device shown in FIG. 1. The access device 200 shown in FIG. 2 provides a detailed view of one implementation of the structures which may be included in an access device to provide at least some of the described features. The access device 200 shown in FIG. 2 is a simplified example in which extraneous elements have been omitted to focus the reader on the specific features discussed. Additional elements may be added without departing from the intended scope of what constitutes an access device.

A processor unit 240 may be included to coordinate the functions of the access device 200. For example, the processor unit 240 may be configured to coordinate the process of receiving requests for content (e.g., query parameters such as keywords) and presenting one or more interfaces including the requested content.

The access device 200 shown in FIG. 2 includes a network input/output interface ("network I/O") 235. The network I/O 235 is configured to transmit and receive communications via a network such as the Internet, a local area network, a wide area network, a peer-to-peer network, a cellular network, a satellite network, a public switched telephone network, any combination thereof, or other communication system for exchanging data between electronic devices. In one implementation, the network I/O 235 is configured to transmit request messages for item data and receive content (including enhanced content) in response, as will be described in further detail below.

As content for an item is received by the access device 200, an item asset manager 220 may be configured to organize the received content. This can include directing the storage of the received content in the memory 250. In the implementation shown in FIG. 2, the item asset manager 220 is implemented as instructions residing in a memory 250 that, when executed, cause the access device 200 to perform the functions described. In some implementations, the item asset manager 220 may be implemented as a hardware device (e.g., circuit) configured to perform the functions described.

The item asset manager 220 may manage the removal of content from the memory 250. For example, if a session is terminated, the item asset manager 220 may remove content obtained during the session or another previous session. For example, a threshold number of sessions' data to preserve may be defined, such as via an item processing configuration. Once the number is exceeded, the content from the oldest session is removed. In some implementations, the threshold may be specified as a quantity of memory. When the quantity of memory used by content exceeds the predetermined threshold, the item asset manager 220 may remove content, starting with the oldest content as measured between a time the content was received and the current time.

The access device 200 may include an interface generator 210 configured to cause display of a graphical interface showing at least a portion of the received content. In the implementation shown in FIG. 2, the interface generator 210 is implemented as instructions residing in the memory 250 that, when executed, cause the access device 200 to perform the functions described. In some implementations, the interface generator 210 may be implemented as a hardware device (e.g., circuit) configured to perform the functions described.

The interface generator 210 may provide display instructions that can be used by the display 400 for presenting the content. In some implementations, the interface generated by the interface generator 210 may include one or more control elements configured to detect interactions by the user. As the interface detects the interactions, interaction information may be received by the access device 200. The interaction information may be used by the interface generator 210 to adjust the interface. For example, if a user selects a thumbnail image associated with content showing one view of the item, the selection may cause the interface generator 210 to present an animated transition from content currently shown in a main viewing area to content associated with the selected thumbnail image.

An audio output 285 may be included in the access device 200 to cause presentation of audio content. For example, where the item is a tea kettle, it may be desirable to provide an audio file including the sound the tea kettle makes when water is boiling. In some implementations, the audio output 285 may be provided in conjunction with visual output. For example, a video may include a corresponding audio track for synchronized playback.

Enhanced content, such as content including a physics model, may be received for an item at the access device 200. An item physics engine 230 may be provided to coordinate the presentation of the physical properties identified by the physics model through the devices available to the access device 200 such as a display, a haptic output device 287, or the audio output 285. In the implementation shown in FIG. 2, the item physics engine 230 is implemented as instructions residing in the memory 250 that, when executed, cause the access device 200 to perform the functions described. In some implementations, the item physics engine 230 may be implemented as a hardware device (e.g., circuit) configured to perform the functions described.

The access device 200 may further include a power source 280. The power source 280 may include a wired or wireless source of power sufficient to supply operational power to the elements described. In some implementations, the power source 280 may include a battery or other rechargeable source. In some implementations, the power source 280 may include a solar panel array.

The elements of the access device 200 are coupled by a bus 290. The bus 290 is configured to allow the elements to exchange data (such as the messages described herein) and/or power. In some implementations, parallel busses may be included, one for data and one for power.

In some implementations, the access device 200 may include a non-transitory computer-readable memory configured to store executable instructions. The memory 250 may be configured for this purpose. In such a configuration, the processor unit 240 may be in data communication with the computer-readable memory storing the executable instructions. The processor unit 240 may be programmed by the executable instructions to implement the features described.

As noted, the access device 200 shown in FIG. 2 is a simplified access device and other implementations may include additional features. One or more microphones may be included to capture audio from the user (e.g., utterances or other sounds). A speech processing system may be included. The speech processing system may implement various modules and components for receiving spoken input from a user and determining what the user meant. In some implementations, a speech processing system can include an automatic speech recognition ("ASR") module that receives audio input of a user utterance and generates one or more likely transcriptions of the utterance. ASR modules typically use an acoustic model and a language model. The acoustic model is used to generate hypotheses regarding which words or subword units (e.g., phonemes) correspond to an utterance based on the acoustic features of the utterance. The language model is used to determine which of the hypotheses generated using the acoustic model is the most likely transcription of the utterance based on lexical features of the language in which the utterance is spoken.

Figure 3:
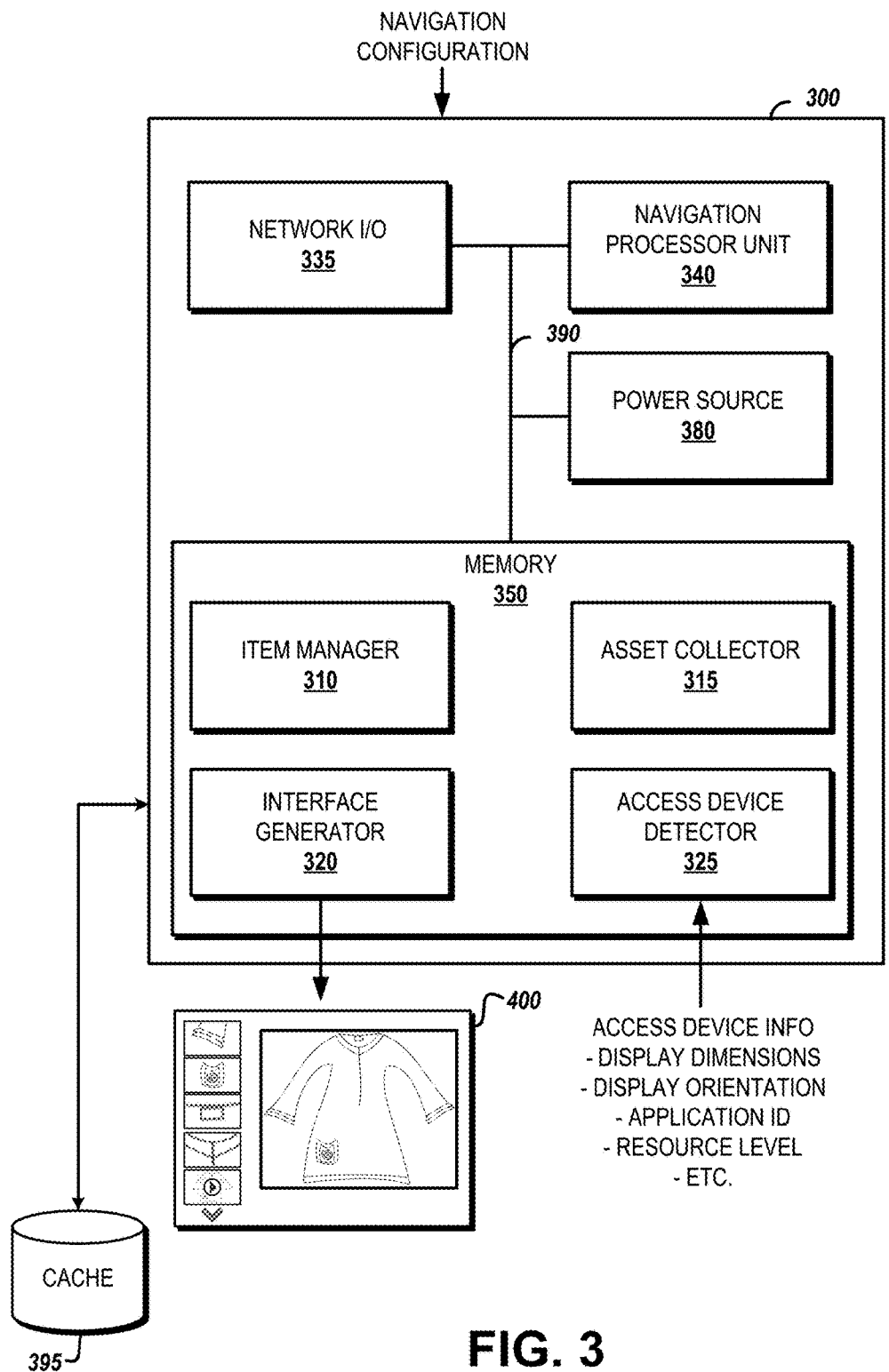
FIG. 3 is a block diagram depicting illustrative components of an embodiment of a navigation generator implemented by the content enhancement engine shown in FIG. 1.

FIG. 3 is a block diagram depicting illustrative components of an embodiment of the navigation generator implemented by the content enhancement engine shown in FIG. 1. The navigation generator 300 shown in FIG. 3 provides a detailed view of one implementation of the structures which may be included in a navigation generator to provide at least some of the described features. The navigation generator 300 shown in FIG. 3 is a simplified example in which extraneous elements have been omitted to focus the reader on the specific features discussed. Additional elements may be added without departing from the intended scope of what constitutes a navigation generator.

A navigation processor unit 340 may be included to coordinate the functions of the navigation generator 300. For example, the navigation processor unit 340 may be configured to coordinate the process of receiving requests for navigation content (e.g., item identifier, content showing the item, etc.) and generating one or more interfaces including the requested content.

The navigation generator 300 shown in FIG. 3 includes a network input/output interface ("network I/O") 335. The network I/O 335 is configured to transmit and receive communications via a network such as the Internet, a local area network, a wide area network, a peer-to-peer network, a cellular network, a satellite network, a public switched telephone network, any combination thereof, or other communication system for exchanging data between electronic devices. In one implementation, the network I/O 335 is configured to receive content (or identifiers thereof) and requests for enhanced content, transmit enhanced content such as a navigation interface for presentation via the display 400, and communicate request and response messages for access device information that can be used to generate the navigation interface, as will be described in further detail below.

An item manager 310 may be included in the navigation generator 300 to obtain and organized information for an item. For example, for a given item, there may be a variety of content that can be included in the navigation interface. In some implementations, the content may be obtained from the catalog system 110 and/or other content source such as a networked search engine. An asset collector 315 may be included to retrieve content from remote locations and, in some implementations, the cache 395. In the implementation shown in FIG. 3, the item manager 310 and the asset collector 315 are implemented as instructions residing in a memory 350 that, when executed, cause the navigation generator 300 to perform the functions described. In some implementations, one or both of the item manager 310 and the asset collector 315 may be implemented as one or more hardware devices (e.g., one or more circuits) configured to perform the functions described.

Whereas the item manager 310 is configured to retrieve and maintain the content that will be included in a navigation interface for a specified item, an interface generator 320 may be included to generate the specific enhanced content including display instructions for the navigation interface. In the implementation shown in FIG. 3, the interface generator 320 is implemented as instructions residing in the memory 350 that, when executed, cause the navigation generator 300 to perform the functions described. In some implementations, the interface generator 320 may be implemented as a hardware device (e.g., circuit) configured to perform the functions described.

The interface generator 320 may receive a notification message from the item manager 310 when the content for an item has been identified. The interface generator 320 may be configured to generate a general interface for presenting the content. The interface generator 320, in generating the interface, may be configured to generate a preview image (e.g., thumbnail) for a content element. The preview image includes a smaller representation of the item shown in content. The representation may be smaller in size (e.g., dimension of the image) or in resource requirements to store and/or transmit (e.g., memory and/or bandwidth). Generating the preview image may include one or more of scaling the content for which the preview is being generated, changing the format of the encoding used for the content, compressing the content, or the like. In some implementations, the preview may include a series of images such as a video file, animated image, or HTML video.

The interface generator 320 may be configured to identify and remove redundant content. For example, a request for content describing an item may be transmitted to the catalog system 110. In response, a set of content may be received. The set of content may include two images that provide the same or substantially similar views of the item. The redundancy between the two images may be detected by generating a hash value for each image and comparing the respective hash values. If the hash values are the same, the images may be deemed duplicates. Two images may be identified as redundant is through comparison of pixels between the images. For example, random locations within the images may be sampled. The number of locations may be specified using the interface configuration. The pixel information at the random locations from the respective images may then be compared. If all or a predetermined portion of the locations are correlated (e.g., similar pixel information), the images may be deemed redundant. The predetermined portion may be specified using the interface configuration. Other or additional redundancy checks may be included such as color profile comparison (e.g., histogram or average color values), object detection, comparison of image masks for the images, and the like.

If the content included in the set of content is audio, redundancy may be detected based on comparison of one or more of hash values for the respective audio files, the waveforms of the audio included in the audio files, metadata for the audio file (e.g., title, author, file name, file size, file format, etc.), or the like. In some implementations, a transcription of the audio files may be obtained such as via an automatic speech recognition system. The transcripts of the two audio files may then be compared and, if a sufficient portion of the transcripts are similar, the files may be deemed redundant.

Video content generally is a composite of audio and image data. As such, similar redundancy identification techniques as described above with reference to image and audio content may be used to identify redundant video content elements.

Once redundant content is identified, the interface generator 320 may be configured to select one of the redundant content elements for inclusion in the display 400. The selection may be based on a navigation configuration provided to the navigation generator 300. For example, the navigation configuration may include information configuring the interface generator 320 to favor content having certain characteristics (e.g., resolution, dimensions, format, sample rate, length, etc.) over others. In some implementations, the selection may be based on characteristics of the access device 200 that will be receiving the display 400. For example, if the access device 200 has limited resources, it may be desirable to remove a large, resource intensive version of the content in favor of a smaller, more efficient version of the content.

The interface generator 320 may be configured to generate interactive control elements for inclusion in the display 400. The interactive control elements may include hyperlinks, buttons, icons, data input fields (e.g., text field, drop down, file uploader), or the like. The interactive control elements may be associated with content. For example, a preview image may be interactive such that when an interaction is detected with the preview image, the display 400 is adjusted. For example, the display 400 may change the visibility of an indicator for a portion of an item shown in the preview image interacted with.

In some implementations, it may be desirable to generate specific versions of the navigation interface tailored for the access device that will be receiving and presenting the display information. In such implementations, an access device detector 325 may be included. The access device detector 325 is configured to detect access device information such as display dimensions, display orientation, an identifier for an application being used to display the interface, resource level for the access device (e.g., power, network bandwidth, processor bandwidth, memory, etc.), and the like.

In the implementation shown in FIG. 3, the access device detector 325 is implemented as instructions residing in the memory 350 that, when executed, cause the navigation generator 300 to perform the functions described. In some implementations, the access device detector 325 may be implemented as a hardware device (e.g., circuit) configured to perform the functions described.

The access device detector 325 may detect access device information based on a received request for enhanced content. The request may include header information or other metadata providing information about the access device 200, application of the access device that generated the request, and resources (e.g., network type) available to the access device 200.

In some implementations, the access device detector 325 may obtain additional information about the access device 200. The additional information may be obtained using information about the access device 200 included in the request such as a device identifier or username. Based on this information, the access device 200 information can be retrieved. In some implementations, the information may be retrieved from the access device 200 based on a request from the access device detector 325 transmitted to the access device 200. The request may include the information elements the access device detector 325 is seeking. In some implementations, this information may be included as part of session initiation (e.g., session initiation protocol session; real time transport protocol session) between the access device 200 and the content enhancement engine 1700.

In some implementations, the access device detector 325 may obtain the access device information from the catalog system 110. For example, where the navigation generator 300 is providing the display 400 to the catalog system 110 which then forwards the enhanced content to the access device, the catalog system 110 may store information about the access device 200 and/or its user. Such information may be provided to the access device detector 325 as part of the request message that initiates the generation of the display 400. In some implementations, the access device detector 325 may request this information from the catalog system 110.

In some implementations, the access device detector 325 may identify a service provider for the access device 200. The service provider may be, for example, an internet service provider or wireless service provider. The service provider may present an interface to service requests for access device information. In some implementations, the access device detector 325 may provide information about the access device (e.g., IP address, device identifier, etc.) in a message requesting additional access device information. In response, the service provider may provide all or some of the requested information.

In some implementations, the service provider may provide information to help control the flow of traffic through its network. As such, the service provider may provide information about the traffic that may be permitted for an access device rather than specific details about a particular access device. This may include the types of content that can be received by the access device 200, limits on the quantity of content that can be received by the access device 200, network speed for the access device 200 (e.g., 3G, 4G, LTE, enhanced LTE, Wi-Fi, etc.), whether the access device 200 is roaming, and the like. This information can be used by the navigation generator 300 to identify what content should be included in the display 400.

Whether the navigation interface is general or custom, the interface generator 320 provides the display 400 as an output. The display 400 may be provided in machine readable format for presentation via the access device 200. In some implementations, the machine readable format may be HTML or another mark-up language. Within the machine readable format, the content to be displayed, the location of where to display the content, interactive control elements associated with one or more of the content elements to be displayed, textual information, audio information, or the like may be identified.

Figure 4:
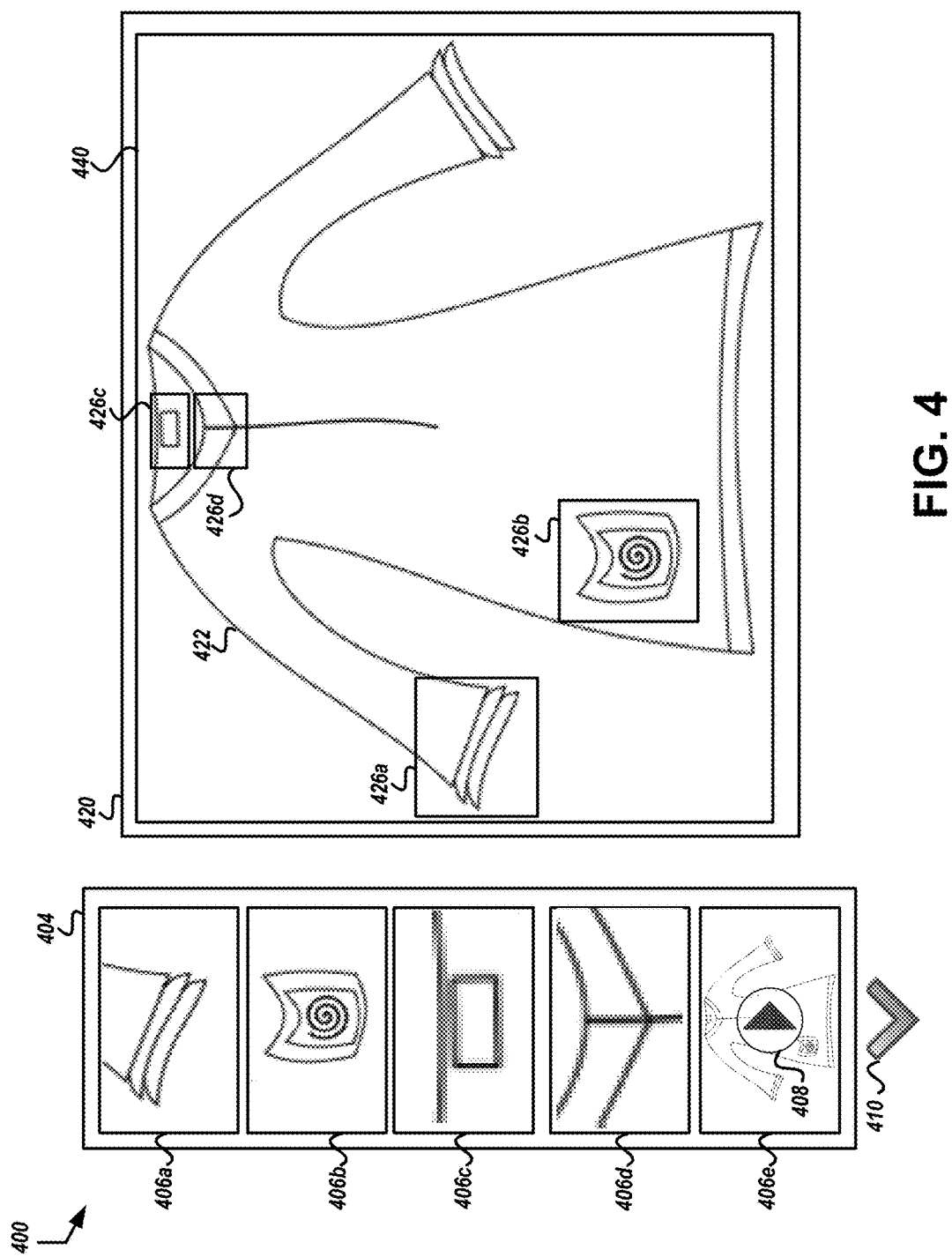
FIG. 4 is a pictorial diagram of an example of content generated by the navigation engine and displayed by the access device of FIG. 3.

FIG. 4 is a pictorial diagram of an example display generated by the navigation engine of FIG. 3. The display 400 includes a main display zone 420 and a film strip display zone 404. The main display zone 420 is shown presenting an image of an item 422. The display 400 may include information identifying the image of the item 422 as the initial image to show because it provides the full view of the item 422. Within the main display zone 420, four points of interest are identified, 426a, 426b, 426c, and 426d. The points of interest correspond to content showing detailed views of the item at the respective areas. Based on image analysis of the main image and the content showing the detailed views, visual indicia of the points of interest may be included within the main display zone 420. The image analysis may identify what area content showing a detailed view is illustrating by comparing features of the detailed view with the main view. Features may include comparing color, color transitions, color gradient locations, color gradient orientations, edges, or identifiable reference points for the item (e.g., for a print of a work of art, a corner of the print). The visual indicia provide context to allow intuitive browsing of the various content.

For example, if an interaction (e.g., click, tap, selection) of the point of interest 426a is detected, the main display zone 420 may be adjusted to replace an overview image 440 of the item 422 with a detailed view 406a. The adjustment may include animating a transition from the overview image to the detailed view 406a such as by zooming into the detailed view. This may be achieved by interpolation and/or blurring from the initial view to the detailed view 406*a*. If an additional detail view exists, the same process may be repeated to zoom in further.

The display 400 may also include a control element to zoom out. In zooming out, the animation may be reversed to adjust the main display zone 420 to return to a broader view of the item 422 showing more features than the detailed view such as the detailed view 406*a*. In this way, the display 400 provides orienting context to the different content showing the item.

The film strip display zone 404 may include more thumbnails (e.g., preview images) than can be shown concurrently with the main view. In such implementations, a control element 410 may be included to permit adjustment of the thumbnails shown in the film strip display zone 404. As one thumbnail is removed from the film strip display zone 404, the remaining thumbnails are moved up and a new thumbnail is added to the film strip display zone 404. While the film strip display zone 404 shown in FIG. 4 is a vertical film strip display zone 404, it will be appreciated that the film strip display zone 404 may be oriented horizontally or at an angle depending on, for example, access device information such as the orientation of the access device, orientation of the display device, display device shape, etc.

In some implementations, the previews included in the film strip display zone 404 may include graphical indicium of the type of content previewed. For example, preview of detailed view 406*e* includes a playback icon 408. This icon 408 may indicate that the content previewed can be played back (e.g., is audio or video content). In some implementations, an icon or other indicium indicating the content is enhanced content may be included.

Returning to FIG. 3, the navigation generator 300 may further include a power source 380. The power source 380 may include a wired or wireless source of power sufficient to supply operational power to the elements described. In some implementations, the power source 380 may include a battery or other rechargeable source. In some implementations, the power source 380 may include a solar panel array.

The elements of the navigation generator 300 are coupled by a bus 390. The bus 390 is configured to allow the elements to exchange data (such as the messages described herein) and/or power. In some implementations, parallel busses may be included, one for data and one for power.

In some implementations, the navigation generator 300 may include the memory 350. The memory 350 may be implemented as non-transitory computer-readable memory configured to store executable instructions. The memory 350 may include RAM, ROM, and/or other persistent, non-transitory computer readable media. The memory 350 can store an operating system that provides computer program instructions for use by a navigation processor unit 340 or other elements included in the navigation generator 300 in the general administration and operation of the navigation generator 300. The memory 350 can further include computer program instructions and other information for implementing aspects of the present disclosure. In such a configuration, the navigation processor unit 340 may be in data communication with the computer-readable memory storing the executable instructions. The navigation processor unit 340 may be programmed by the executable instructions to implement all or a portion of the features described.

The navigation generator 300 may include or be in data communication with a cache 395. The cache 395 may be a specially architected memory designed to store content received by the navigation generator and enhanced content generated by the navigation generator 300.

The navigation generator 300 may also receive a navigation configuration. The navigation configuration allows the navigation generator 300 to dynamically adjust how item content is processed to generate enhanced navigation interfaces. For example, the navigation configuration may identify layouts for different access device types. The navigation configuration may identify cache management features such as quantity of data to cache, duration to cache data, cache rotation scheme (e.g., first-in-first-out, largest out first, etc.), and the like. Multiple configurations may be specified using the navigation configuration. When a request for a navigation interface is received, the request may include identifying information for which the navigation interface will be generated. This can allow different companies to offer the enhanced navigation features described using a custom look-and-feel.

Figure 5:
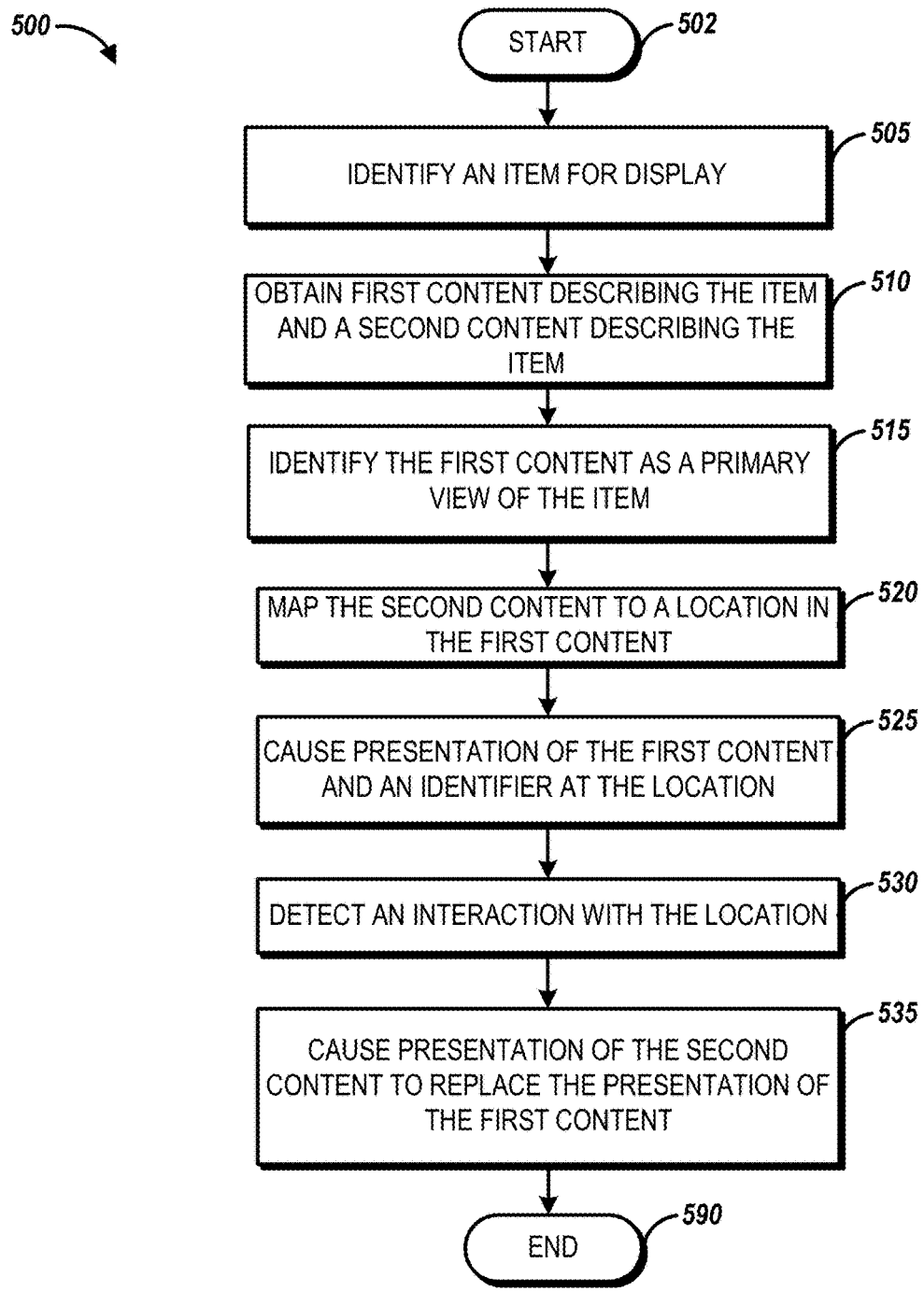
FIG. 5 is a flow diagram depicting an illustrative routine executed by the navigation generator for generating content for an item.

FIG. 5 is a flow diagram depicting an illustrative routing executed by the navigation generator for generating content for an item. The process 500 shown in FIG. 5 illustrates how an enhanced navigation interface can be generated for presenting content related to an item. The process 500 shown in FIG. 5 may be implemented in whole or in part by a navigation generator such as discussed in FIGS. 1 and 3 above to generate a display such as those discussed and shown in FIG. 4. Some or part of the process 500 shown in FIG. 5 may be implemented by or in conjunction with a content enhancement workstation such as shown in FIG. 1 and discussed above.

The process 500 begins at block 502. At block 505, an item is identified for display. The item may be identified using an item identifier provided in a message received from the access device 200 or the catalog system 110. In some implementations, the message may include a search result received from the catalog system 110. The identification may include parsing the message to extract the item identification information. Examples of item identifiers include Amazon Standard Identification Numbers (ASINs), European Article Numbers (EANs), International Standard Book Numbers (ISBNs), Universal Product Codes (UPCs), or the like. In some implementations, the identification of the item may be based on an image of the item. Image recognition based on the pixel information included in the image of the item may be used to identify the item. For example, a color histogram of the image of the item may be compared to a database of color histograms for previously identified items. By correlating characteristics of a color histogram for a known item with characteristics of a color histogram for an unknown item, the identity of the unknown item may be determined.

At block 510, first content demonstrating the item and second content demonstrating the item are obtained. The first content and the second content may, respectively, include one or more of audio, video, text, or other content demonstrating features of the item. The content may be obtained from the item data store 126 of the catalog system 110. Obtaining the content from the item data store 126 may include transmitting a message including information identifying the item and receiving the content or a reference (e.g., URL) to the content. In some implementations, a set of two or more content elements may be obtained for demonstrating the item. The content obtained at block 510 establishes the available content that can be provided via the navigation interface.

At block 515, the first content is identified as the primary view of the item. The identification of content as the primary view may be based on pixel analysis of the available content for the item including image information. The pixel analysis may include object recognition whereby descriptive information about the item (e.g., metadata or a description from the item data store 126) indicates a type for the item. The type may be "shirt" or "book" or "game" or the like. The object recognition may utilize an image and the type to determine how much of the item is shown in the image content. For example, content including a detailed view of an item does not provide as holistic a view of the item as content including an overview of the item. In FIG. 4, the overview image 440 shown in the main display zone 420 shows the complete item while the detailed view 406a shows only a portion of the item 422. In such instances, the object recognition may identify a shirt in the overview image 440 but not in the detailed view 406a.

The pixel analysis may include generating region masks. A region mask identifies contiguous regions including pixel information for an item. The mask for the detailed view 406a would be truncated by the top of the image. Furthermore, the shape of the mask would be irregular and inconsistent with the item type (e.g., shirt). In contrast, the mask formed from the overview image 440 would form a complete shape with space between the mask and the image borders. The presence of space between each image border alone or in conjunction with assessment of the shape of the mask may be used to confirm the overview image 440 as the primary view.

In some implementations, the pixel analysis may include feature detection. The features of an item appearing in each of at least two images may be identified and then aligned. The features may include corners, blobs, Harris corners, difference of Gaussians of corners or Harris corners, or the like. In some implementations, the pixel analysis may include object detection. The object detection may include identifying objects using histogram of oriented gradients or scale invariant feature transforms (SIFT).

In some implementations, more than one image may provide a full view of the item. For example, if a first image shows the front of the shirt and a second image shows the back of the shirt, the quantity of item shown in each could be deemed equal. In such instances, further analysis of the images may be conducted to distinguish between the possible candidates. One analysis may consider characteristics of the images such as resolution, dimensions, blurriness, color, format, size for storage, etc. The analysis may identify the image having the most detail (e.g., highest resolution, largest dimensions, least blurriness, most color, highest quality format, highest storage size, etc.) as the primary view. In some implementations, an image may be removed from consideration as the primary image if the image has a characteristic that falls below a predetermined threshold. The threshold may be specified in the navigation configuration.

In some implementations, the analysis to identify a primary image from multiple images may include determining an amount of detail shown in each image. The amount of detail may be determined using pixel information in the image. For example, the color changes caused by showing details such as seams, zippers, characters, illustrations, or other ornamental features can be used to determine a level of detail. The changes may be absolute color changes between two or more pixels. The changes may be expressed as a gradient identifying change over a range of pixels (e.g., linear color gradient for pixels on a line between the lower left corner of an image and the upper right corner of the image). The image including more detail would be identified as the primary image. In some implementations, an image may be removed from consideration as the primary image if the image has a level of detail that falls below a predetermined threshold. The threshold may be specified in the navigation configuration.

In some implementations, the identification of an image as the primary view may be performed via the content enhancement workstation 170. In such implementations, the first image and the second image may be received by the content enhancement workstation 170. The content enhancement workstation 170 may obtain the images, such as described with reference to block 510. The content enhancement workstation 170 may generate and present an interface for receiving a selection of an image as the primary view. Upon detecting the selection such as via an input device coupled with the content enhancement workstation 170, the selection may be transmitted to the content enhancement engine 1700 for further processing.

At block 520, the second content is mapped to a location or region in the first content. Because the first content has been identified as the primary image, the remaining content received may be presented in the navigation interface with reference to the primary image. For example, as shown in FIG. 4, the main display zone 420 includes the overview image 440 showing the item 422. Additional content showing detailed views (e.g., those in the film strip zone 404) can be mapped to locations within the overview image 440 shown in the main display zone 420. The mapping may include pixel analysis of the second content and identifying a location in the first content with an organization of pixels corresponding to the second content. The correlation may include scaling one or both of the first or second content for analysis.

The pixel analysis may include feature detection. The features of an item appearing in each of at least two images may be identified and then aligned. The features may include corners, blobs, Harris corners, difference of Gaussians of corners or Harris corners, or the like. In some implementations, the pixel analysis may include object detection. The object detection may include identifying objects using histogram of oriented gradients or scale invariant feature transforms (SIFT).

In some implementations, the mapping of block 520 may be performed via the content enhancement workstation 170. The content enhancement workstation 170 may generate and present an interface for receiving a selection of an area of the first image showing the portion of the item depicted in the second image. For example, the interface may display the first image and receive a bounding box selection identifying the area of the first image showing the portion of the item depicted in the second image.

In some implementations, the content enhancement workstation 170 may receive mapped to locations detected via pixel analysis. In such implementations, the content enhancement workstation 170 may be used to confirm the machine generated mapping. If an adjustment to the mapping is received from the content enhancement workstation 170, the adjustment information may be used to refine the pixel analysis for subsequent images. The refinement may include retraining a model for mapping images.

The mapping may be performed relative to the primary view. In such implementations, the location information may be provided with reference to location within the first content. In some implementations, content may be mapped to multiple views. For example, in addition to the detailed view 406b of a pocket, content showing a further detailed view of the pattern appearing on the pocket may be provided. In such implementations, the mapping may be repeated for the content including the view of the pattern.

The mapping may be represented in a hierarchy starting with the primary view as the root node of the hierarchy. From the root node, each content element to be included in the display 400 may be represented as a child node. The child nodes may include the location information indicating the portion of the parent (e.g., root node) shown in the content. In cases where a further detailed view of a child node is available, another child node may be associated with the initial detailed view node and include similar location information. In implementations including the content enhancement workstation 170, an interface for editing the hierarchy may be provided to generate the mapping. The interface may allow selection of a node within the hierarchy and moving the selected node to a location within the hierarchy to indicate the relationship between content associated with the node and at least one other node in the hierarchy.

Figure 6:
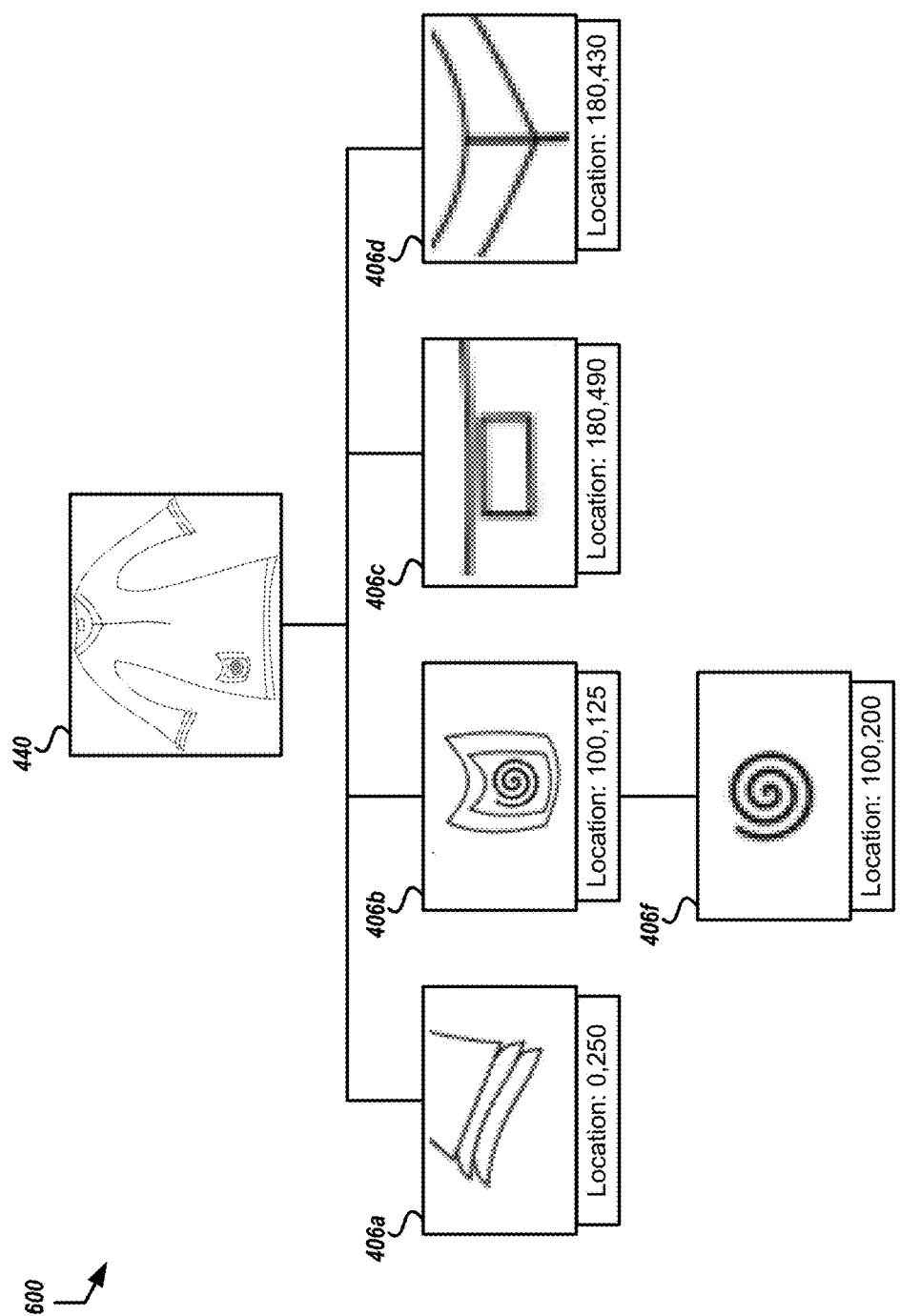
FIG. 6 is a pictorial diagram of a hierarchy generated by the navigation engine that maps content elements to locations in content such as an overview image.

FIG. 6 is a pictorial diagram of a hierarchy mapping generated by the navigation engine associating content elements to locations in an overview image. The hierarchy 600 includes content shown in FIG. 4 beginning at a root node with the overview image 440. From there, detailed views 406a, 406b, 406c, and 406d are associated with x, y locations within the overview image 440. The x, y locations identify an upper-left pixel within the overview image 440 of an area shown by the associated detailed view. The x, y location information may be provided as coordinates, percentages, or other information sufficient to locate an image in an image associated with its parent node. Detailed view 406f shows how a child node of the overview image 440 can also be associated with an additional detailed view. In FIG. 6, the detailed view 406f is associated with location information for its immediate parent node (e.g., the detailed view 406b). In some implementations, it may be desirable to include location information for the detailed view 406f for all nodes along a path to the root node. In this way, the detailed view 406f may be accurately associated with content when displayed via the display 400. The hierarchy 600 may be used to identify a relationship between multiple content items for a location. In some implementations, the nodes included in the hierarch 600 may be associated with interactions. For example, where two content elements are included at a location, a first interaction may cause presentation of the first element while a second interaction may cause presentation of the second element.

Returning to FIG. 5, at block 525, presentation of the first content and an identifier at the location of the second content is caused. In some implementations, this may include transmitting a message including the presentation information to the access device 200. The presentation may include instructions to launch an application on the access device 200 for rendering the navigation interface on the display 400. The identifier for the location shown in the second content may be a box or other visible indicia. In some implementations, a veil may be presented over the location shown by the second content. The presentation of identifiers may be toggled using a control element also presented on the display 400. When activated, the visible indicia are shown as overlays to the primary view. When deactivated, the indicia may be hidden. In some implementations, a preview of content showing the detailed view of the item (e.g., second content) may be presented via the display 400. In such implementations, if an interaction such as a mouse over event is detected with the preview of the content showing the detailed view of the item, the visible indicium for the location shown in the content showing the detailed view interacted with may be activated within the main display zone 420.

The location may also be associated with an interaction. In some implementations, the interaction may be a select or click event. At block 530, an interaction with the location is detected. An interaction may include location information indicating where the interaction was detected. An interaction may include an interaction type such as a click, double-click, identification of which button was clicked, a tap, a gesture, etc. An interaction may also include a direction.

Once the interaction is detected (e.g., determined to be within the location and/or of a predetermined type), at block 535, the second content is presented in place of the first content. As discussed above, the presentation may include animating motion from content showing an overview of an item to the selected content showing a detailed view of the item. This helps orient the user to where the navigation is taking them. In cases where the second content is a video or audio content type, upon presentation in the main display zone 420, playback may be automatically initiated. At block 590, the process ends.

The display 400 may include hints indicating the availability of content to facilitate navigation of different content for an item as discussed above. Once content is presented, additional hinting may be displayed such as a hint indicating how to interact with enhanced content.

Figure 7:
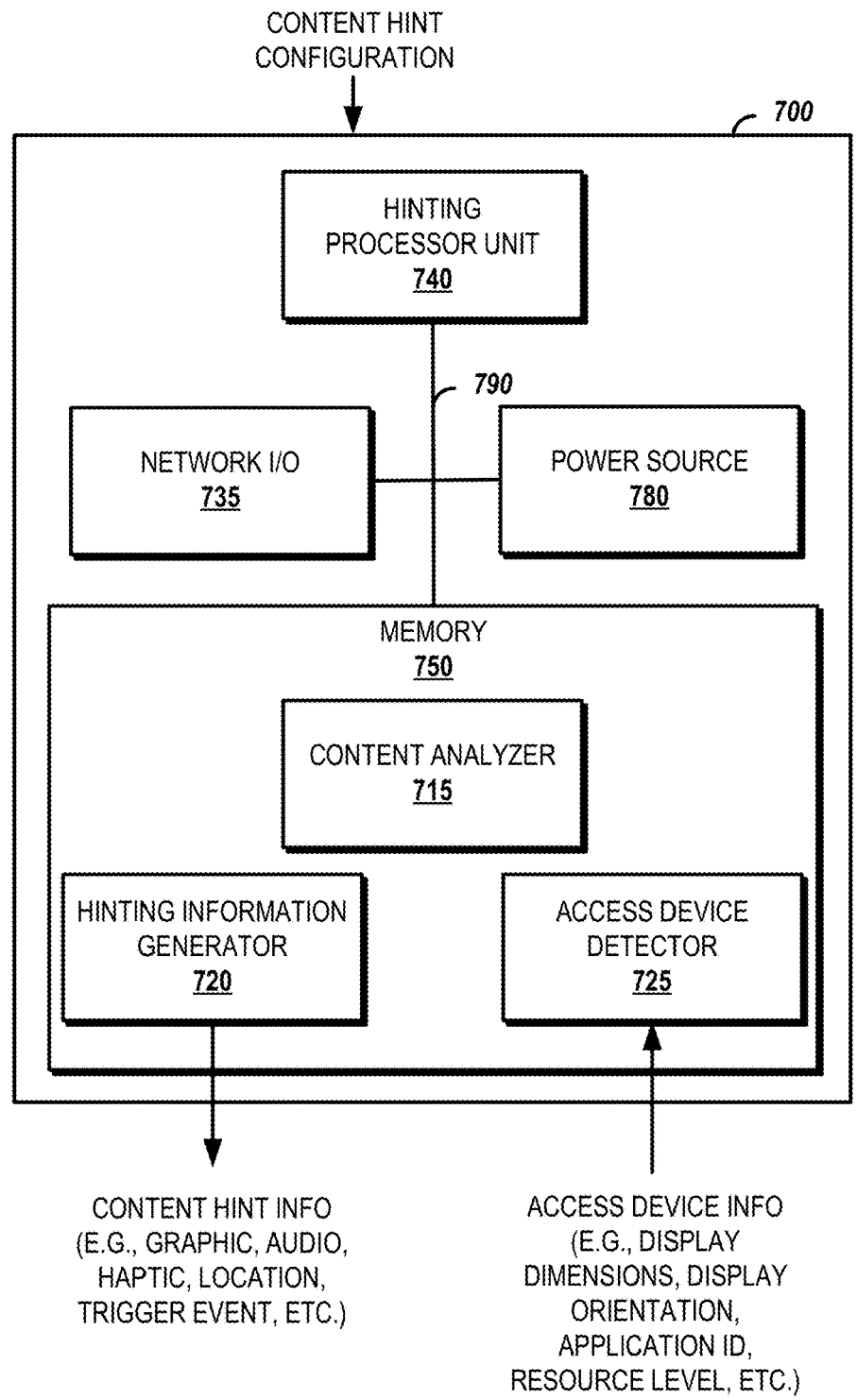
FIG. 7 is a block diagram depicting illustrative components of an embodiment of a content hint generator implemented by the content enhancement engine shown in FIG. 1.

FIG. 7 is a block diagram depicting illustrative components of an embodiment of a content hint generator implemented by the content enhancement engine shown in FIG. 1. The content hint generator 700 shown in FIG. 7 is a simplified example in which extraneous elements have been omitted to focus the reader on specific features discussed. Elements may be added, removed or modified without departing from the intended scope of what constitutes a content hint generator.

A hinting processor unit 740 may be included to coordinate the functions of the content hint generator 700. For example, the hinting processor unit 740 may be configured to coordinate the process of receiving requests for hints for enhanced content and generating one or more hints for the enhanced content.

The content hint generator 700 shown in FIG. 7 includes a network input/output interface ("network I/O") 735. The network I/O 735 may be configured to transmit and receive communications via a network such as the Internet, a local area network, a wide area network, a peer-to-peer network, a cellular network, a satellite network, a public switched telephone network, any combination thereof, or other communication system for exchanging data between electronic devices. In some implementation, the network I/O 735 is configured to receive content (or identifiers thereof) and requests hints for content, transmit hints for content, and communicate request and response messages for access device information that can be used to generate hints for content, as will be described in further detail below.

Hints may be graphical, audio, textual, haptic, or other detectable indicia produced by the access device to suggest the interaction available for enhanced content. The hint may be generated so as to invite user interaction with the enhanced content. The hint may provide an indication of the type of interaction needed to activate the enhanced content. For example, if the enhanced content includes perspective views of an item to correspond to the angle of the access device, icons may be included in the hint suggesting movement of the access device. The hint may provide an indication of a location and a direction of interaction needed to activate the enhanced content. For example, if enhanced content demonstrating unzipping of a zipper is available for an item, the hint may provide a visual indicium near the zipper along with an arrow pointing in the direction the zipper can be unzipped. In some implementations, the hint may include a preview of what the enhanced content will show when there is interaction with the hint. In the zipper example, the arrow may be animated to move along the zipping direction. In some implementations, the movement may be accompanied with ghost or phantom lines indicating how the item will be shown during the interaction. In some implementations, a portion of the enhanced content may be displayed providing, via the hint, a preview of the enhanced content.

Figure 8:
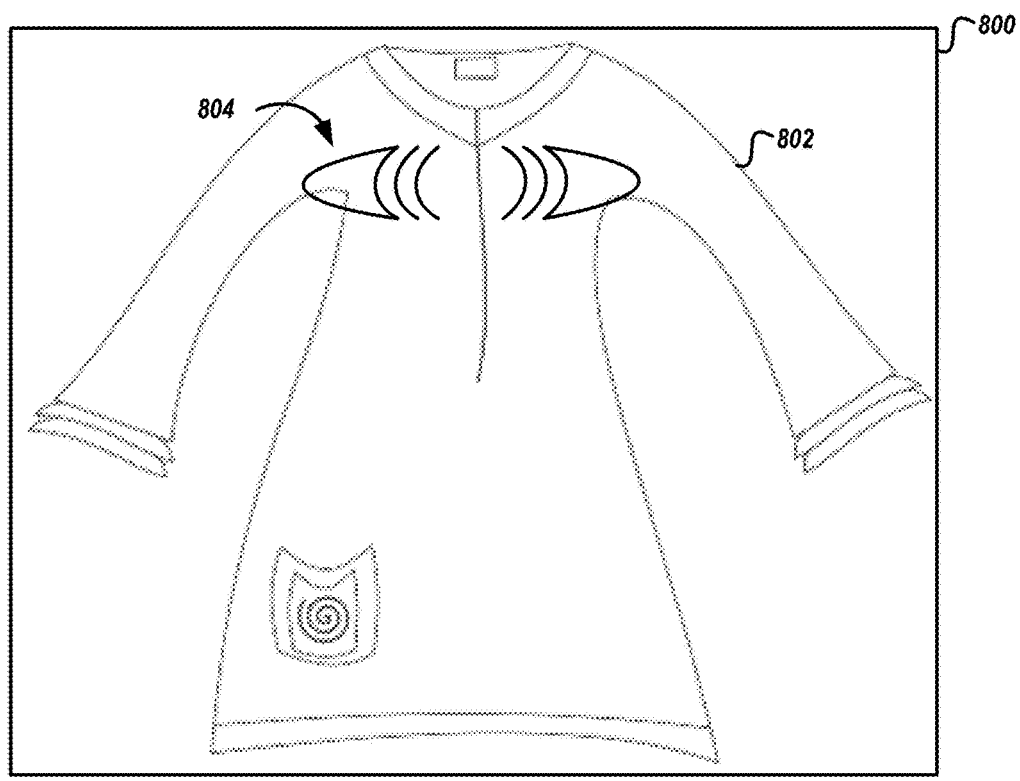
FIG. 8 is a pictorial diagram showing an example of a content hint generated by the content hint generator and displayed in conjunction with content for an item.

FIG. 8 is a pictorial diagram showing an example of a content hint generated by the content hint generator and displayed in conjunction with content for an item. The content may be enhanced content showing a sweatshirt 802. The enhancement may be to simulate the opening of the top of the sweatshirt 802 to allow a user to see the inside of the sweatshirt 802. For such enhanced content, it may be desirable to provide a hint 804 that suggests with which part of the sweatshirt 802 a user can interact and what kind of interaction will activate the enhancement. The hint 804 is shown as a graphic overlay on an image of the sweatshirt 802.

Returning to FIG. 7, to generate a hint, such as the hint 804, the content may be analyzed by a content analyzer 715. In the implementation shown in FIG. 7, the content analyzer 715 is implemented as instructions residing in a memory 750 that, when executed, cause the content hint generator 700 to perform the functions described. In some implementations, the content analyzer 715 may be implemented as a hardware device (e.g., circuit) configured to perform the functions described.

The content analyzer 715 may be configured to analyze attributes of the content to identify the appropriate hint for the content. The attributes of the content that may be analyzed include metadata for the content, content type (e.g., image content, video content, textual content, audio content, enhanced content) of the content, pixel and/or audio data included in the content, the item shown in the content, or a type (e.g., clothing, book, hardware, footwear, etc.) for the item shown in the content.

In some implementations, the metadata included with the content may indicate the enhancements for the content such as interactive areas, type of interaction, etc. This metadata about the enhancements may be extracted from the content by the content analyzer 715 and provided to a hinting information generator 720.

In some implementations, the content analyzer 715 may detect the type of the content. The content analyzer 715 may detect the type of the content using a file name of the content whereby a naming convention may be used to infer the content type for content. A content hint configuration may be provided to the content hint generator 700. The content hint configuration may include a mapping of file type information to content types. The content analyzer 715 may use this configuration information to infer the content type using the file name of the content. Similar configuration information may be used to infer content type from other attributes for the file such as author, size, location, and the like.

The content analyzer 715 may analyze information included in the content. For example, animated content may include certain sequences of bytes within the file containing the content. These sequences may be detected by the content analyzer 715 and used to categorize the content and/or determine the enhancements thereto. The content analyzer 715 may be configured to analyze the information encoded by the content. For example, if the content includes a series of images, the content analyzer 715 may be configured to identify the ways the images differ over the series to identify a location within the content that changes and/or how the image shown at the location changes over the series. The information about where and how the content changes can be provided to the hinting information generator 720 to guide the placement of the hint for the content to the location where the content is changing.

The hinting generator 720 shown in FIG. 7 is implemented as instructions residing in the memory 750 that, when executed, cause the content hint generator 700 to perform the functions described. In some implementations, the hinting generator 720 may be implemented as a hardware device (e.g., circuit) configured to perform the functions described.

In some implementations, the hinting information generator 720 may generate the hint using information received or detected from the access device that will be presenting the hint. For example, it may be desirable to provide hints that can be presented via the access device. Consider, for example, an access device that does not include a haptic output device. For such access devices, it may be desirable to exclude haptic hinting because such a hint would be ignored by the access device. Consider, as another example, an access device that is accessing the content via a low bandwidth network and, perhaps, while roaming. For such access devices, it may be desirable to keep the quantity of data provided to the access device as low as possible. In such instances, it may be desirable to generate resource efficient hints or omit them altogether. When considering access device information, the content hint configuration may include threshold values for one or more access device resource levels and/or types. By comparing a threshold value to the detected or received value for the access device, the hint information generator 720 can dynamically provide the hint tailored for the access device.

The hint information generator 720 may also tailor the hint to the specific interactions that are detectable by an access device. For example, if the access device is a smartphone, the smartphone may support detection of touch events on a display. However, if the access device is a desktop computer, touch events may not be supported. In each case, how the interaction is detected (e.g., touch versus mouse event) may differ. These differences may lead to different hints depending on the access device that will be rendering the hint. The differences may be in the actual hint presented (e.g., graphics, sound, or haptics) and/or in how the hint is activated.

The access device specific hinting may be omitted in some implementations. In some implementations, a default hint tailoring may be provided. For example, where the hinting information generator 720 generates hints for access devices associated with a specific catalog system, the catalog system may track common access devices for their users. This information can be used to generate an average or default access device profile including the characteristics most commonly associated with the access devices used for the catalog system.

An access device detector 725 may be included to receive and/or detect the access device information. Similar to the access device detector 325 shown in FIG. 3, the access device detector 725 may be configured to detect access device information such as display dimensions, display orientation, an identifier for an application being used to display the interface, resource level for the access device (e.g., power, network bandwidth, processor bandwidth, memory, etc.), and the like.

The access device detector 725 shown in FIG. 7 is implemented as instructions residing in the memory 750 that, when executed, cause the content hint generator 700 to perform the functions described. In some implementations, the access device detector 725 may be implemented as a hardware device (e.g., circuit) configured to perform the functions described.

The access device detector 725 may detect access device information based on a received request for hint. The request may include header information or other metadata providing information about the access device 200, application of the access device that generated the request, and resources (e.g., network type) available to the access device 200.

In some implementations, the access device detector 725 may obtain additional information about the access device 200. The additional information may be obtained using information about the access device 200 included in the request such as a device identifier or username. Based on this information, the access device 200 information can be retrieved. In some implementations, the information may be retrieved from the access device 200 based on a request from the access device detector 725 transmitted to the access device 200. The request may include the information elements the access device detector 725 is seeking. In some implementations, this information may be included as part of session initiation (e.g., session initiation protocol session; real time transport protocol session) between the access device 200 and the content enhancement engine 1700.

In some implementations, the access device detector 725 may obtain the access device information from the catalog system 110. For example, the catalog system 110 may request hints and include them in a response to the access device 200. In such implementations, the catalog system 110 may store information about the access device 200 and/or its user. Such information may be provided to the access device detector 725 as part of the request message that initiates the generation of the hint. In some implementations, the access device detector 725 may request this information from the catalog system 110.

In some implementations, the access device detector 725 may identify a service provider for the access device 200. The service provider may be, for example, an internet service provider or wireless service provider. The service provider may present an interface to service requests for access device information. In some implementations, the access device detector 725 may provide information about the access device (e.g., IP address, device identifier, etc.) in a message requesting additional access device information. In response, the service provider may provide all or some of the requested information.

In some implementations, the service provider may provide information to help control the flow of traffic through its network. As such, the service provider may provide information about the traffic that may be permitted for an access device rather than specific details about a particular access device. This may include the types of content that can be received by the access device 200, limits on the quantity of content that can be received by the access device 200, network speed for the access device 200 (e.g., 3G, 4G, LTE, enhanced LTE, Wi-Fi, etc.), whether the access device 200 is roaming, and the like. This information can be used by the content hint generator 700 to identify what types and quantities of hint information may be provided to the access device 200.

The content hint generator 700 may further include a power source 780. The power source 780 may include a wired or wireless source of power sufficient to supply operational power to the elements described. In some implementations, the power source 780 may include a battery or other rechargeable source. In some implementations, the power source 780 may include a solar panel array.

The elements of the content hint generator 700 are coupled by a bus 790. The bus 790 is configured to allow the elements to exchange data (such as the messages described herein) and/or power. In some implementations, parallel busses may be included, one for data and one for power.

In some implementations, the content hint generator 700 may include the memory 750. The memory 750 may be implemented as non-transitory computer-readable memory configured to store executable instructions. The memory 750 may include RAM, ROM, and/or other persistent, non-transitory computer readable media. The memory 750 can store an operating system that provides computer program instructions for use by a hinting processor unit 740 or other elements included in the content hint generator 700 in the general administration and operation of the content hint generator 700. The memory 750 can further include computer program instructions and other information for implementing aspects of the present disclosure. In such a configuration, the hinting processor unit 740 may be in data communication with the computer-readable memory storing the executable instructions. The hinting processor unit 740 may be programmed by the executable instructions to implement all or a portion of the features described.

The content hint generator 700 may also receive a content hint configuration. The content hint configuration allows the content hint generator 700 to dynamically adjust how content is processed to generate hints. For example, the content hint configuration may identify hint types to use for different access device types. Multiple configurations may be specified using the content hint configuration. When a request for a hint is received, the request may include identifying information for which the hint will be generated. This can allow different companies to offer the hint features described using a custom look-and-feel (e.g., iconography, font, color, etc.).

Figure 9:
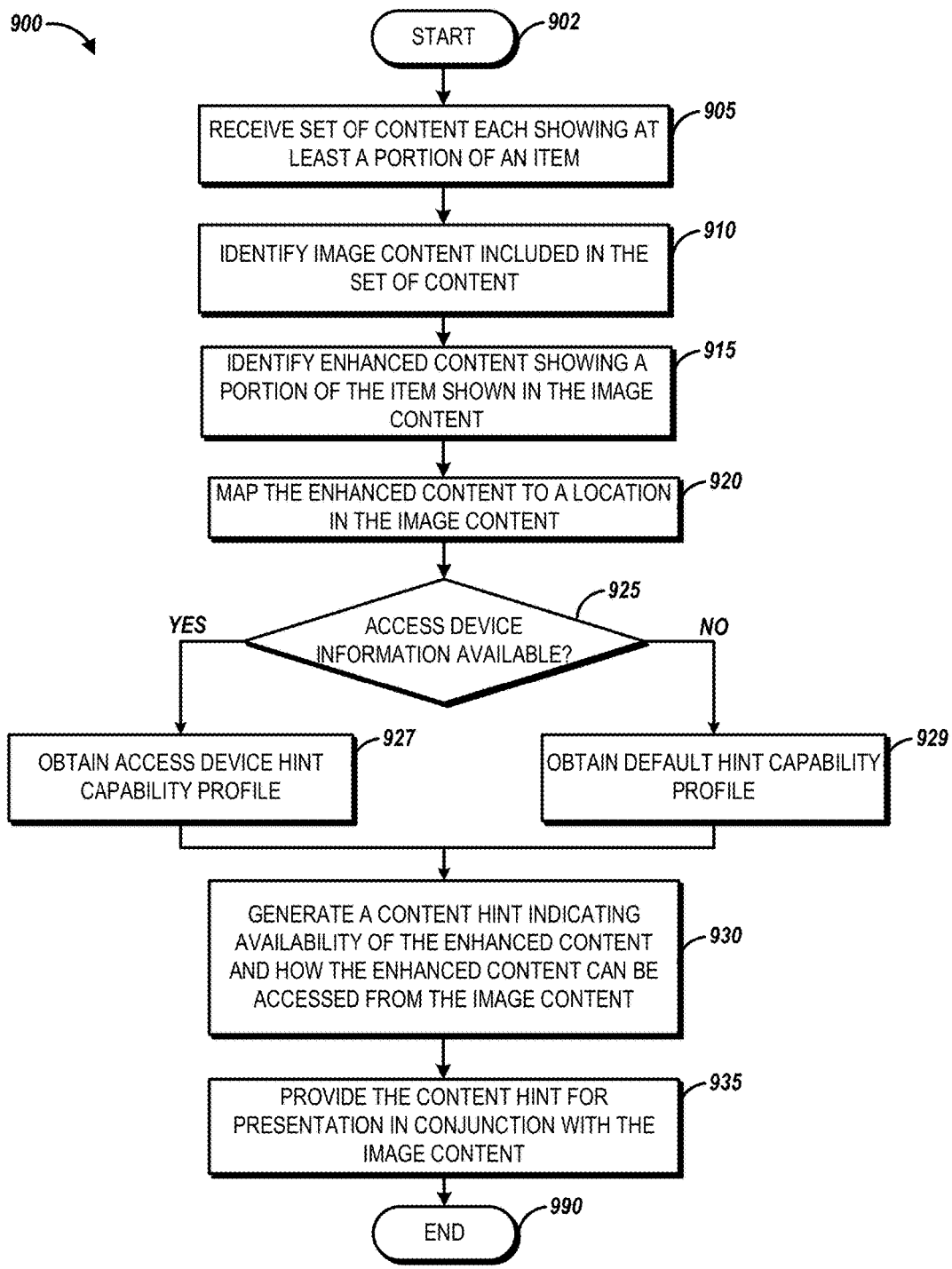
FIG. 9 is a flow diagram depicting an illustrative routine executed by the content hint generator for generating an enhanced content hint.

FIG. 9 is a flow diagram depicting an illustrative routine executed by the content hint generator for generating an enhanced content hint. The process 900 shown in FIG. 9 illustrates how a hint can be generated for content related to an item. The process 900 shown in FIG. 9 may be implemented in whole or in part by a content hint generator such as discussed in FIGS. 1 and 7 above to generate a hint such as those discussed and shown in FIG. 8. Some or part of the process 700 shown in FIG. 9 may be implemented by or in conjunction with a content enhancement workstation such as shown in FIG. 1 and discussed above.

The process 900 begins at block 902. At block 905, a set of content each showing at least a portion of an item is received. The set of content may include enhanced content, image content, audio content, video content, textual content, etc. The content or references to allow retrieval of the content include in the set may be received. In cases where the set of content includes enhanced content, it may be desirable to provide a hint to indicate where and/or how the enhanced content can be interacted with.

At block 910, image content included in the set of content is identified to serve as the reference point for the hinting. The process 900 shown and described in FIG. 9 uses the image content included in the set of content to provide the hint for enhanced content included in the same set of content. In some implementations, the identification of the image content at block 910 may include generating image content showing the item that is also shown in the enhanced content. In such implementations, the hint may be provided with reference to the generated image.

In some implementations, the identification of the image content may be performed via the content enhancement workstation 170. In such implementations, the set of content may be received by the content enhancement workstation 170. The content enhancement workstation 170 may generate and present an interface displaying at least a portion of the set of content. The interface may include control elements (e.g. buttons, links, or data entry fields) for receiving a selection of image content to serve as the reference point for hinting. Upon receiving the selection, such as via an input device coupled with the content enhancement workstation 170, the selection may be transmitted to the content enhancement engine 1700 for further processing.

At block 915, enhanced content is identified that shows a portion of the item shown in the image content from block 910. In some implementations, the enhanced content may be identified before identifying the image content. In such instances, the image content may be identified based on the enhanced content. For example, the image content may be identified by comparing the portion of the item shown in enhanced content to a quantity of the portion of the item shown in other content included in the set of content. The image content may be identified as the content showing the highest quantity of the portion of the item shown in the enhanced content. This can include a proportionality test whereby the content showing the highest proportion of the portion of the item is selected. For example, where a first image shows an overview of a shirt and a second image shows the collar of the shirt, when selecting an image to include hinting for enhanced content showing the collar, both the first and the second image may show the entire collar. However, the second image, because it is a detailed image of the collar, more of the image content in the second image is devoted to the collar. Accordingly, the second image may be identified as the content for conveying the hint.

In some implementations, the identification of the enhanced content may be performed via the content enhancement workstation 170. In such implementations, several elements of enhanced content may be received by the content enhancement workstation 170. In some implementations, the content enhancement workstation 170 may receive an identifier for the item and, using the identifier, obtain the available enhanced content for the item from the catalog system 110 or other remote content repository. The content enhancement workstation 170 may generate and present an interface displaying at least some of the obtained enhanced content. The interface may include control elements (e.g. buttons, links, or data entry fields) for receiving a selection of the enhanced content showing a portion of the item of interest (e.g., shown in the image content from block 910). Upon receiving the selection, such as via an input device coupled with the content enhancement workstation 170, the selection may be transmitted to the content enhancement engine 1700 for further processing.

At block 920, the enhanced content is mapped to a location in the image content. The mapping may include mapping the area of interactivity from the enhanced content to an area in the image content.

Figure 10:
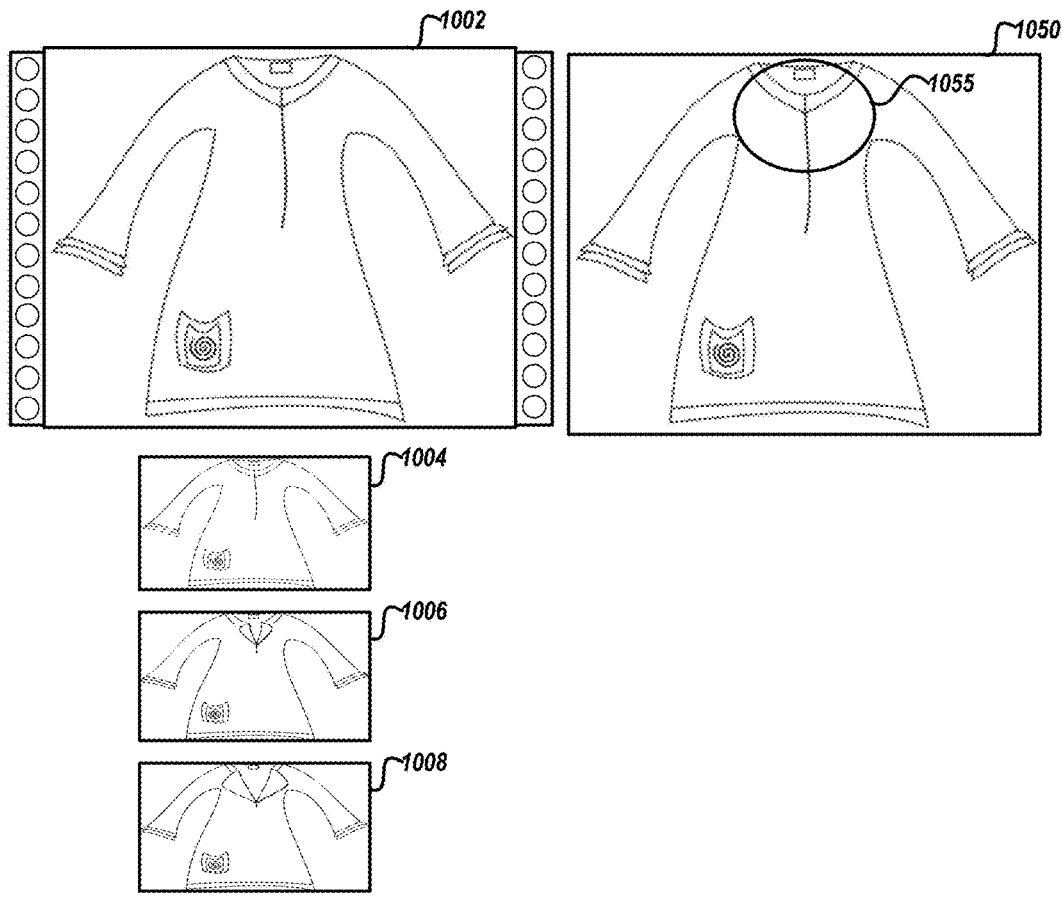
FIG. 10 is a pictorial diagram showing how a location for placement of an enhanced content hint may be detected by the content hint generator shown in FIG. 7.

FIG. 10 is a pictorial diagram showing how a location to place an enhanced content hint within content may be detected by the content hint generator by detecting an object shown in the enhanced content. The enhanced content 1002 may include video content and associated interaction mappings to demonstrate the opening of the collar of the item shown in the enhanced content 1002. The enhanced content 1002 may include a series of images each showing different states for the collar. Three images that may be included in the series of images (e.g., images 1004, 1006, and 1008) are also shown. In the example shown in FIG. 10, image content 1050 is identified for presenting the hint. As the item as shown in both images is the same, the mapping of the location of the interaction may include identifying the location of the interaction in the enhanced content. Since the images show the item in the same way, the location should correspond to a similar location on the image content 1050. For example, if the location of the interaction for the enhanced content is centered at x,y pixel location 150, 150 in the enhanced content 1050, the location for placing the hint on the image content would be 150, 150.

In some implementations, the image content 1050 may not show the same view as presented in the enhanced content 1002. In such implementations, the location may be translated by scaling, interpolating, or other image processing to align the image content 1050 with the portion of the item shown in the enhanced content 1002.

To identify the location of the interaction, the enhanced content may be analyzed, such as by a content analyzer (e.g., the content analyzer 715 shown in FIG. 7). As shown in FIG. 10, image analysis of the first image 1004 in the series and the last image 1008 in the series may be performed. The image analysis may identify the differences between these two images (e.g., 1004 and 1008). For the images shown in FIG. 10, the location of pixels that changed from the first to the last image may be identified as a location 1055 for the hint. The difference may be compared to a threshold such that minor differences due to encoding, noise, or other non-substantive variables are ignored in favor of more substantial changes in how the image is shown in the images. The threshold may be specified via the content hint configuration.

As discussed above, a hint may provide the location of the interaction as well as a direction for the interaction to activate enhanced content. As part of the mapping at block 920, the direction of interaction may be mapped.

Figure 11:
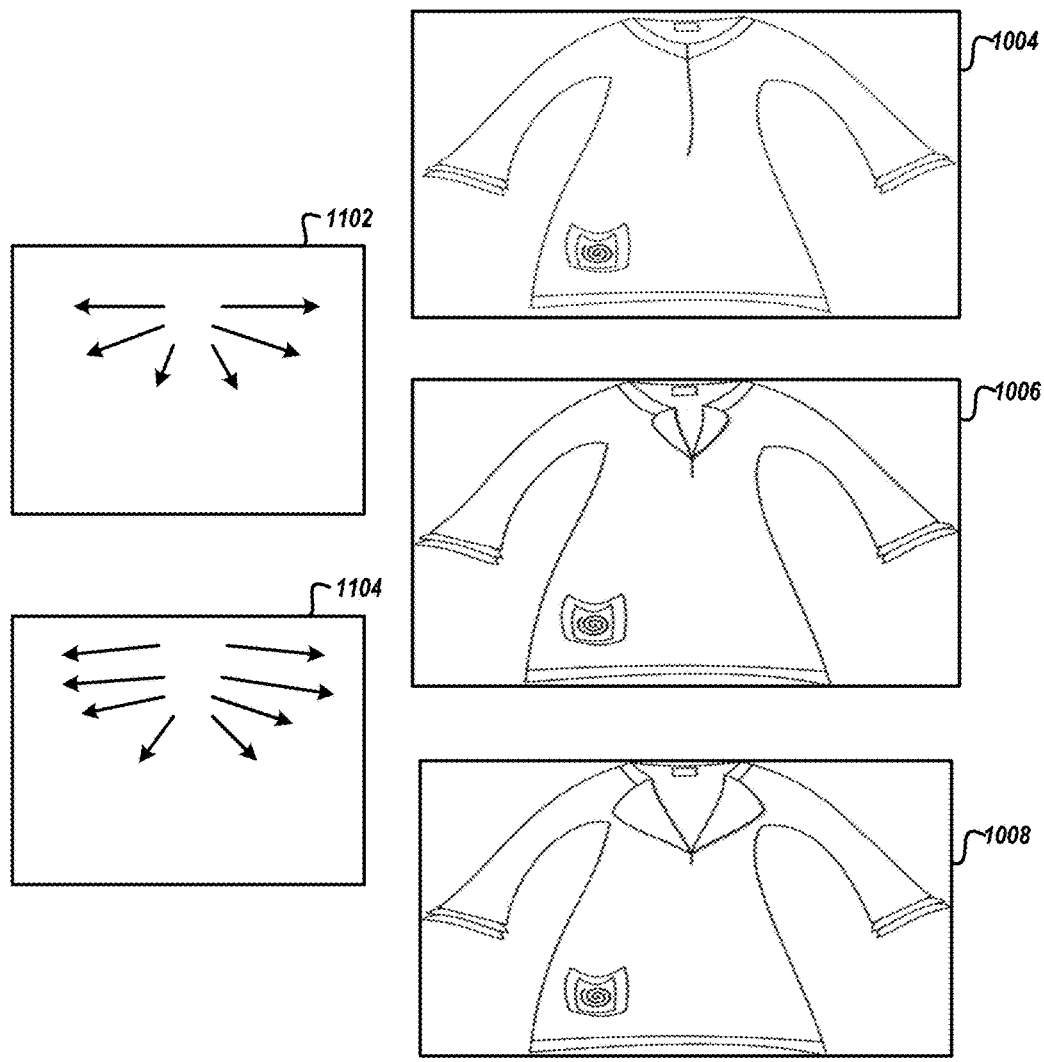
FIG. 11 is a pictorial diagram showing how an interaction direction indicated by an enhanced content hint may be detected by the content hint generator as part of generating an enhanced content hint using an optical flow of pixels.

FIG. 11 is a pictorial diagram showing how an interaction direction indicated by an enhanced content hint may be detected by the content hint generator as part of generating an enhanced content hint for enhanced content using optical flow of pixels within the enhanced content. The series of images included in the enhanced content 1002 may be analyzed to determine not only where the images change through the series, but also a direction in which the images change. Optical flow is one image analysis that may be used to detect motion between images in the series of images. In some implementations, feature flow may be used to detect motion. Where optical flow identifies movement of pixels, feature flow identifies movement of image features. Feature flow motion detection may include identifying a feature shown in an image and tracking the feature between images in the series of images. In some implementations, the features used for feature flow detection may be identified using an area of interest. The area of interest may be preconfigured (e.g., the center of the first image in the series of images), or provided as annotation information for an image. For example, the enhancement workstation 170 may present the image via an interface. The interface may receive an indication of a feature to use for feature flow motion detection for the image.

Feature or optical flow detection may include identifying motion vectors between two images. The vectors may be represented on a map of the image relative to the location where the motion is detected. A first flow map 1102 showing the motion detected between image 1004 and 1006 is shown in FIG. 11. A second flow map 1104 showing the motion detected between image 1006 and 1008 is also shown in FIG. 11. One or more flow maps may be used to detect the location and/or direction of movement within the enhanced content. Although FIG. 11 shows maps for images in sequence, it may be desirable to map motion from between the first image and the last image in the series. While this map may not provide incremental details between intervening images, using only the first and the last images can provide a computational efficiency that may be desirable in resource constrained operational environments.

In some implementations, information included in the enhanced content may be captured with an optical flow sensor. For example, a camera to capture images for inclusion in the enhanced content while an optical flow sensor (e.g., optical flow camera) may capture motion information within the same field of view as the camera. The motion information obtained by the optical flow sensor may be combined with the images captured by the camera to form part of the enhanced content. In such implementations where motion information is included in the enhanced content, the mapping may use the motion information included in the enhanced content.

In some implementations, the mapping between the enhanced content and the image content may be performed via the content enhancement workstation 170. In such implementations, the enhanced content and the image content may be received by the content enhancement workstation 170. The content enhancement workstation 170 may generate and present an interface presenting the enhanced content and the image content. The interface may include control elements (e.g. buttons, links, or data entry fields) for receiving the mapping. For example, the image content may be dragged, resized, rotated or otherwise manipulated to overlay a portion of the enhanced content. The mapping may include storing the manipulations to the image content to indicate the relationship between the image content and the enhanced content. Upon receiving the mapping, such as via an input device coupled with the content enhancement workstation 170, the mapping may be transmitted to the content enhancement engine 1700 for further processing.

In some implementations, the content enhancement workstation 170 may receive a mapping between the enhanced content and image content generated through analysis and comparison of the enhanced content and the image content. In such implementations, the content enhancement workstation 170 may be used to confirm the machine generated mapping. If an adjustment to the mapping is received from the content enhancement workstation 170, the adjustment information may be used to refine analysis and/or comparison used for mapping images and enhanced content. The refinement may include retraining a model for mapping content.

Returning to FIG. 9, having identified the location of the interaction and, in some implementations, a direction of interaction, at block 925, a determination is made as to whether access device information is available. The access device information may be used to further tailor the hint to be presented via the image content. As discussed above, the capability of the access device or intended user of the access device can dictate the types and/or format of the hinting provided.

If no access device information is available, or if access device specific hinting is disabled (e.g., via the content hint configuration), at block 929, a default hint capability profile is obtained. The default hint capability profile may identify the standard hint type and format to use for generating hints. In some implementations, the standard hint type may include instructions for specifying alternative hints (e.g., conditional hinting such that if the access device has haptics, then provide the haptic hint). Returning to decision block 925, if access device information is available, at block 927, an access device specific hint capability profile is obtained. The access device specific hint capability profile may include specific hint type and the format for specifying hints (e.g., XML stylesheet, graphics commands, image format, HTML version supported, etc.).

At block 930, a content hint is generated. The content hint generated indicates the availability of the enhanced content and how the enhanced content may be accessed from the image content. Generating the content hint may include generating an animation demonstrating what portion of the item shown in the image content is enhanced and, in some instances, where the portion will move in the enhanced content. The animations may provide a "ghost" view of the enhanced content. For example, if the enhanced content includes video, a number of frames may be sampled from the video and used to provide the ghost view. The number of frames may be selected from the start of the video or sampled at intervals from throughout the video. In some implementations, the enhanced content may be associated with metadata including content hint information. For example, the metadata may include an action field identifying an action (e.g., opens, moves, or changes state) shown in the enhanced content. The action field information may be used to generate the hint such as by mapping actions to visual indicators for the action (e.g., metadata identifying a move action may be mapped to an arrow graphic). In some implementations, the hint may include playing a portion of the video such as via an alpha-channel image overlaid on the image content.

Generating the content hint may also include generating conditions upon which the hint will be displayed. It may be desirable to hide hints from users who are familiar with the system and/or content. Accordingly, one or more conditions which, upon detection by the access device, will cause a change in the presentation (e.g., display) state of the indicium associated with the hint. For example, a graphical indicium for a hint may be hidden when the content associated with the hint is initially displayed. If no interaction at the location associated with a hint is detected after a predetermined period of time (e.g., 5 seconds, 10 seconds, 2 seconds), the graphical indicium for the hint may be displayed. Similarly, if an interaction is detected with a portion of the content that is not associated with the hint, the graphical indicium for hint may be hidden to liberate display resources for rendering the area being interacted with rather than the hint area.

In some implementations, generating the content hint may include hinting feedback. For example, if a user is presented with the content hint but is not performing the desired interaction to trigger the enhanced content, it may be desirable to provide hinting feedback. The hinting feedback may include presenting an adjustment from the interaction detected and the desired interaction. For example, if the user is swiping at a location too low, the hinting feedback may display an animated line from the detected swipe location to the desired interaction location. In some implementations, it may be desirable to provide hinting feedback if the user correctly performed the interaction indicated by the content hint. Such a feedback may include a haptic response, playback of audio, or presentation of an image.

At block 935, the content hint is provided for presentation in conjunction with the image content. The content hint may include configuration values for the access device to accurately present the hint with the image content. For example, the content hint may specify the location of the hint, graphic form for the hint (e.g., image file, audio file, haptic feedback, icon code, character, etc.) The content hint may also include configuration values for the access device to accurately detect an interaction with the hint for triggering the enhanced content. For example, the content hint may specify a type of interaction (e.g., tap selection, shake, tilt, drag, gesture, eye movement, etc.), direction of interaction, or magnitude of interaction to activate the enhanced content.

One way content may be enhanced is by generating a physics model for the content to introduce interactivity for the content that simulates the "physics," e.g., physical processes, properties, manipulation or phenomena, of or applied to the item shown in the content. For ease of reference any one or combination of the foregoing may be referred to herein as a "physics property." For example, when the content includes video content, a physics model may be generated to associate playback locations in the video content with interactions the content, which interactions simulate physical manipulation of the item shown in the content. For example, video content of an item recorded at a constant height and distance from the item may show the item from all 360 degrees. Playback of the video content may be linear, that is, started and stopped with sequential playback of the content. However, physical manipulation of the item can be simulated by changing properties of the playback such as the speed, location, or scale of the images shown. The changes may be dynamic and in response to interactions detected with the access device displaying the content. For example, if a user slides her finger to the left while the 360 degree video of the item is being displayed so that the items appears to be rotating to the right, playback of the video content may be reversed so as to simulate spinning the item to the left, with the speed of the playback based on the magnitude of the swipe. For example, if the detected interaction is a slow, one centimeter swipe to the left, the video content may be displayed more slowly as to simulate a slow spin. In contrast, if a fast, swipe to the left across the entire screen is detected, the video content may be displayed more quickly so as to simulate more rapid spinning of the item.

Figure 12:
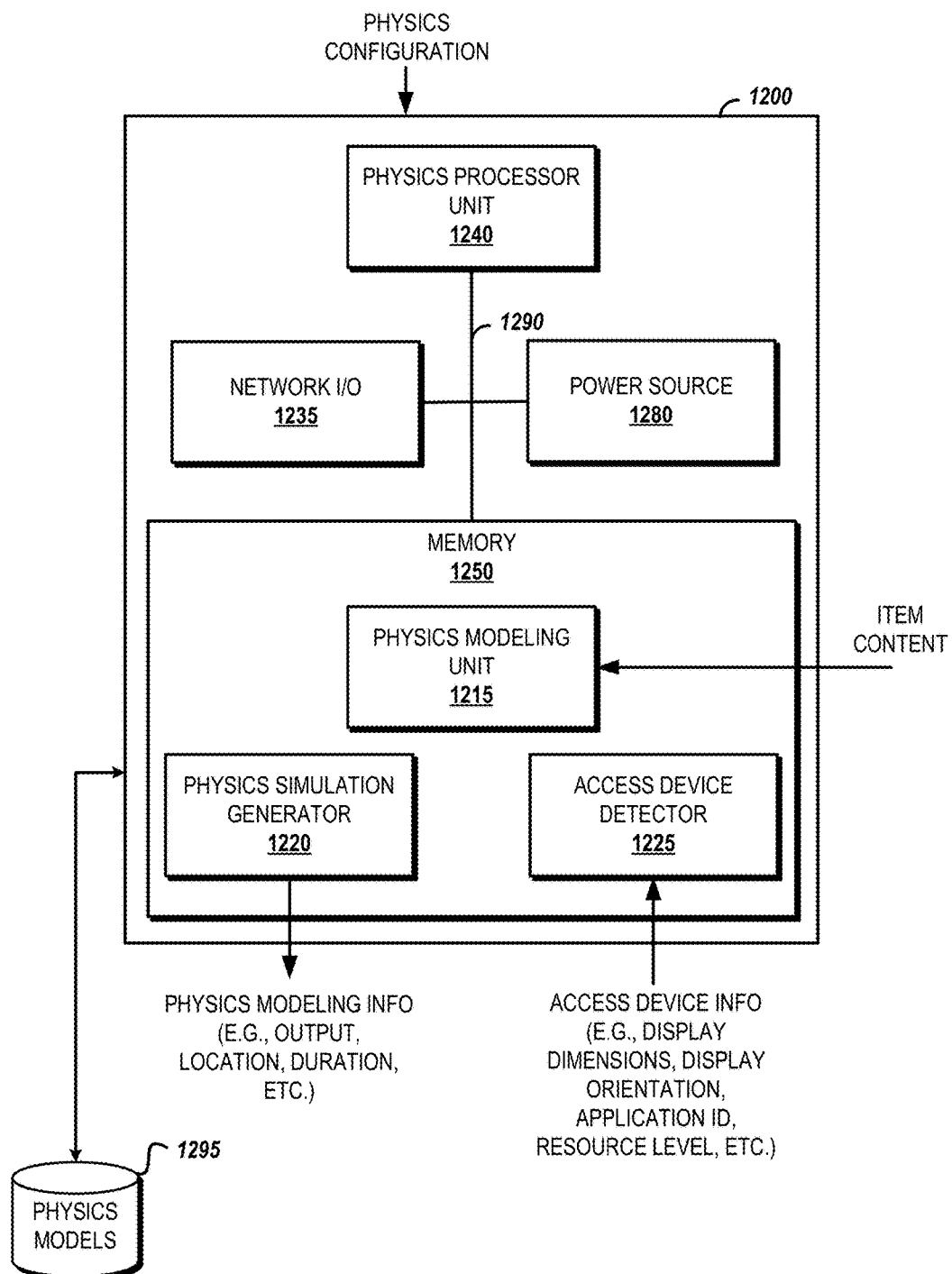
FIG. 12 is a block diagram depicting illustrative components of an embodiment of a physics engine implemented by the content enhancement engine shown in FIG. 1.

FIG. 12 is a block diagram depicting illustrative components of an embodiment of a physics engine implemented by the content enhancement engine shown in FIG. 1. The physics engine 1200 shown in FIG. 12 provides a detailed view of one implementation of the structures which may be included in a physics engine to provide at least some of the described features. The physics engine 1200 shown in FIG. 12 is a simplified example in which extraneous elements have been omitted to focus the reader on the specific features discussed. Elements may be added, modified or removed without departing from the intended scope of what constitutes a physics engine.

Generating a physics model can be a two-step process. First, the content for which the physics model is provided is analyzed to identify the attributes of the item that can be represented in the physics model. For example, texture of an item may be represented in the physics model with haptic feedback. As another example, elasticity of an item can be represented using video content whereby low elasticity is represented by slower playback of the video content than high elasticity which can be represented with rapid playback. A physics modeling unit 1215, as described in further detail below, may be included in the physics engine 1200 to analyze the content.

In some implementations, the analysis of the attributes of the item that can be represented may be performed using the content enhancement workstation 170 and the item physics sensor 175. In such implementations, a physics property of the item may be detected and, using the interaction with the video, audio, haptics, or other perceptible outputs, simulate that physics property.

In some implementations, the analysis may include analyzing the content. As an example, for video showing a zipper being unzipped to a stopping point, computer vision algorithms (e.g., feature/object detection and tracking) may be used to scan images included in the video for the position of the hand. The position of the hand may be tracked for a sequence of images for the video. The locations of the hand may be recorded as part of the physics model. For example, the ending location of the hand may be identified indicating the maximum unzipped position for the zipper. The ending location of the hand may be coordinated with a time point or frame of the video. When the user interacts with the enhanced content, the system can map the user's finger position to the video frames of the zipper, and when the ending location is reached, the video stops playing frames. In some implementations, a haptic "kick" may be provided to simulate the stopping point of the zipper. When the user scrubs their finger in the reverse direction on the touch screen, the frames of video may be played back in reverse at a speed mapping to the speed of the finger.

As another example, for simulating an elastic interaction, video may be recorded showing two hands stretching fabric. One or more item physics sensors (e.g., tension sensors) on the fabric may be used to record the amount of tension in the fabric. This tension data can be mapped to the corresponding frames of the video (e.g., the beginning of the video being associated with the most relaxed state to the end of the video which would be associated with the most tension), and included in the physics model.

In some instances, the tension values and their changes over time (e.g., curves or functions or averages) can be mapped to additional output such as haptic patterns and intensities or to sounds, for inclusion in the physics model. When the user interacts with the enhanced content, the video frames may be presented (e.g., played back) in accordance with the user's finger positions and the physics model might require a harder press or harder pull to move through the corresponding video frames (giving the impression of tension in the fabric), and at the same time the user can feel the haptic buzz change as the tension increases or decreases, or they might hear an audible tone that changes in accordance with the tension in the fabric.

A physics property can be modeled in a variety of ways. For example friction can be mapped to requiring harder or faster touch inputs; changes in light as a product is tilted towards and away from a directed light source can be captured in a video and then video frames can be mapped to accelerometer input; and the motion of heavy fabric moving in response to a breeze can be captured with video and mapped to intensity of input of blowing on a phone microphone. Models simulating these features may include time-based motion mapping to video frames. The models may also enhance a video of a "product interaction capture" in combination with item physics sensing (e.g., tension, light, sound, or motion capture). The model may then provide a mapping of the sensed data to one or more simulated outputs (e.g., haptics, audio, video) coordinated in time (e.g., how fast the play back occurs, when the play back occurs) and/or space (e.g., where the interaction is detected, intensity of interaction detected, etc.) with the video content.

A physics model may be provided to simulate a physics property of an item. The physics model may include information to cause presentation of one or more outputs simulating the physics property. For example, to simulate a surface feature of an item, such as a bump or surface friction, the physics model may indicate that haptic outputs are to be presented. Other examples of the types of simulations are described below. The physics property of the item may depend on a physical attribute of the item. For example, consider a clothing item. The physics property of collar stiffness may be based, in part, on the material with which the collar is made. Physical attributes of an item may include the material forming the item or the size of the item. Other physics properties that may be simulated by the physics model include magnetic properties, thermal properties, or optical properties of the item.

To simulate the physics of an item, a physics model may include an audio physics model. An audio physics model may be generated from audio data representing the item to simulate a physics property of the item. For example, a brush may be associated with audio data representing the sound of the bristles of the brush. The sound of the bristles may be presented to provide one representation of the brush. To enhance the presentation of the item, the sound of the bristles may be represented using haptic output. For example, if the bristles are stiff, the audio physics model may cause generation of a sharp haptic output whereas if the bristles are soft, the audio physics model may cause a haptic output having a lower intensity than the sharp haptic output to be generated. The audio physics model may indicate timing of the presentation of the output, strength (e.g., haptic intensity) of the output, presentation rate for the output, and duration of the output. The audio physics model may be generated based at least in part on analysis of the audio data as will be described below.

A video physics model may be generated from video data representing the item to simulate the physics of the item. Returning to the brush example, if a user were to stroke the bristles of the physical item, the amount of effort needed for the stroke would be dependent on the stiffness of the bristles. A video of the brush may include a series of images showing a finger stroking the brush. Without enhancement, it is difficult if not impossible for a viewer to assess how much effort is needed for the stroking shown in the video. However, this physics property of the bristles can be simulated by, for example, modeling a level of user interaction to trigger presentation the video. For example, the video may be associated with a touch event user interaction. If the physics property of the bristles is stiffness and the bristles for the item shown in the video are rigid, to simulate the effort to stroke the physical item, a touch event interaction with a high threshold may be defined. For example, the touch event interaction may specify a pressure for the touch event. The pressure indicates how much pressure the user causing the interaction applied. The model may include a pressure threshold for presenting the video. The pressure threshold may be higher for more rigid items to simulate the resistance of the item. By comparing the pressure for the touch event interaction with the pressure threshold, the presentation of the video based on the touch event interaction can thus include a tactile experience for the user to simulate the physics property of the item. As another example, the weight of a fabric may be simulated using audio data received by a microphone. For example, the user may blow into the microphone. The time and/or orientation of the playback of a video of the fabric used for an item shown in the video may be coordinated with the based on the audio data and/or direction associated with the blowing. In this way, for lighter fabrics, audio data indicating a soft blow The physics model may be associated with additional content. For example, it may be desirable to include audio, video, image, or textual content to further simulate the physics property of item. For example, a video may show a button on a device. The video may not include sound representing the button press or release. However, it may be desirable to include additional content, associated by the physics model with a portion of the video, to provide an audio cue that the button is pressed or released. In such instances, the physics model may identify a frame of video showing the button in a fully pressed state. The identification may be performed using image analysis of the images included in the video. The physics model may then associate audio data including a clicking sound with the frame of video showing the button in a fully pressed state. With such a physics model, the presentation of the clicking sound may be synchronized with the video to provide a simulation of the button.

The physics model may include associations between presentation points and interactions with the content showing the item. For example, for video content showing an item, the presentation points may be specified as a frame or time within the video content. The physics model may associate (i) a user interaction at a first location within the content with (ii) initiation of presentation of the content. The physics model may associate (i) a user interaction with the content at a location within the content with (ii) a presentation location of the content.

The physics model may define a user interaction by specifying at least one of a type of user interaction (e.g., touch, click, drag, gesture, manipulation of the device (e.g., rotation, shake, etc.), and the like) or a quantity of user interaction (e.g., pressure, speed, distance, and the like for the user interaction). As noted above, the location of the user interaction may also be included in the physics model. Accordingly, the physics model can be used by an access device to detect user interactions and cause presentation of content in response to the detected user interactions whereby the presentation simulates the physics property of the item.

Some physics models may provide a simulation of a physics property of an item. In some implementations, the physics model may provide a simulation of a portion of an item. This portion of the item may show a key object included in the item. The key object may be a discrete component of the item such as a zipper, button, or other functional structure.

Once the item shown in the content has been modeled, physics modeling information to configure the access device 200 (or the item physics engine 226 associated therewith) to present a simulation of the physics of the item represented by the physics model is generated such as by a physics simulation generator 1200. As each access device may have different output devices (e.g., audio output, display, haptic, etc.), the physics model generated for an item shown in content may be translated to specific configuration commands in consideration of the access device 200 and/or the output devices associated therewith. The physics simulation generator 1220, as described in further detail below, may be included in the physics engine 1200 to generate the physics modeling information for an access device based on the physics model.

A physics processor unit 1240 may be included to coordinate the functions of the physics engine 1200. For example, the physics processor unit 1240 may be configured to coordinate the processing of requests for physics modeling, generating the physics model, and transmitting the physics model.

The physics engine 1200 shown in FIG. 12 may include a network input/output interface ("network I/O") 1235. The network I/O 1235 may be configured to transmit and receive communications via a network such as the Internet, a local area network, a wide area network, a peer-to-peer network, a cellular network, a satellite network, a public switched telephone network, any combination thereof, or other communication system for exchanging data between electronic devices. In some implementations, the network IO 1235 is configured to transmit request messages for access device information, receive messages identifying content for physics modeling, and transmit messages including physics model information, as will be described in further detail below.

Messages including requests for physics modeling information for content may be received via the network IO 1235 and provided to the physics modeling unit 1215. In the implementation shown in FIG. 12, the physics modeling unit 1215 is implemented as instructions residing in a memory 1250 that, when executed, cause the physics engine 1200 to perform the functions described. In some implementations, the physics modeling unit 1215 may be implemented as a hardware device (e.g., circuit) configured to perform the functions described.

The physics modeling unit 1215 may receive content as an input and provide a physics model for an item shown in the content as an output. The physics modeling unit 1215 may be configured to obtain the content showing an item for which the physics model is being generated. The physics modeling unit 1215 may be configured to obtain additional content for inclusion in the physics model. For example, it may be desirable to include audio output during an interaction such as the sound of a zipper zipping or unzipping. The additional content may be obtained by transmitting a request for the additional content to the catalog system 110 and receiving a response including the requested additional content or an identifier therefor. In some implementations the system may include a library of content (e.g., video clips, sound clips, etc.) from which such additional content could be obtained. The request may include an identifier for the item shown in the enhanced content. The request may include a desired content type (e.g., audio, video, image, text, haptic) for generating the physics model.

Figure 13:
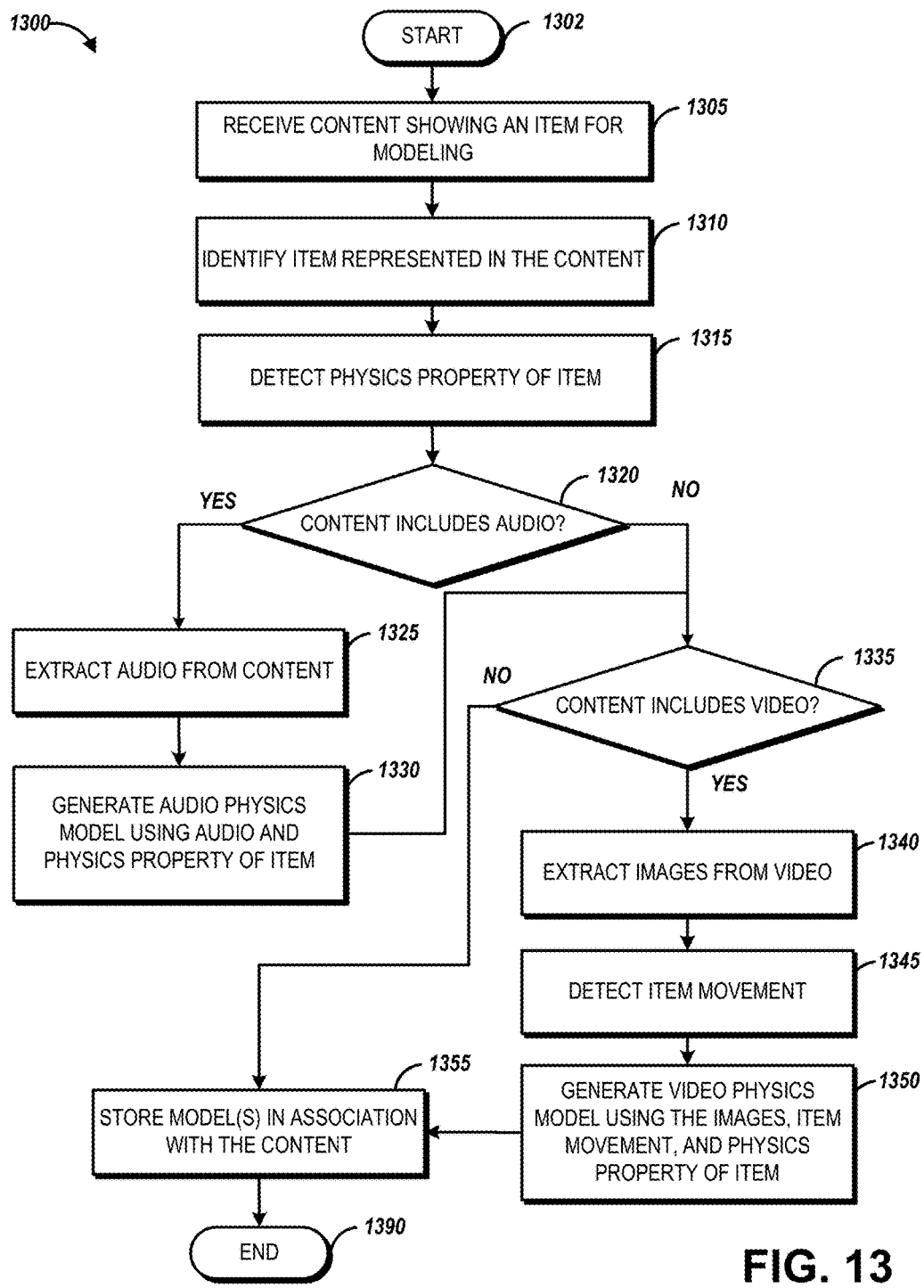
FIG. 13 is a flow diagram depicting an illustrative routine executed by the physic engine for generating a physics model for a physics property of an item represented in the content.

FIG. 13 is a flow diagram depicting an illustrative routine executed by the physic engine for generating a physics model simulating a physics property of an item shown in the content. The process 1300 shown in FIG. 13 illustrates how the physics modeling unit 1215 may generate a physics model for an item shown in content. The process 1300 shown in FIG. 13 may be implemented in whole or in part by a physics engine such as discussed in FIGS. 1 and 12 above. Certain aspects of the process 1300 may be implemented by the physics modeling unit 1215 of a physics engine. In some implementations, aspects of the process 1300 may be implemented by or in conjunction with a content enhancement workstation such as shown in FIG. 1 and discussed above.

The process 1300 begins at block 1302. At block 1305, content showing an item for modeling is received. The content may be provided in a message received from the catalog system 110 or the access device 200 by the physics engine 1200. The message may include the content and/or a reference to the content. In cases where the content is provided by reference (e.g., URL, file name, content identifier), receiving the content at block 1305 may include obtaining the content by transmitting a request for the content based on the reference.

At block 1310, a key object of the item represented in or by the content is identified. The key object is a portion of the item for which physics will be modeled. Table 1 below includes examples of key objects that may be detected for corresponding item types.

TABLE 1

| Item Type | Example Key Objects |
| --- | --- |
| Shirt | Button |
| | Collar |
| | Zipper |
| | Embroidery |
| Electronic Device | Button |
| | Display |
| | Accessory Port |
| Brush | Bristles |
| | Handle |

Where the content includes image content, the key object may be identified using object recognition analysis of the image content. The object recognition analysis may identify objects shown in the image content. The identification may include identifying how much of the image content is devoted to certain objects. In some implementations, the object shown in the majority of the image content may be identified as the key object. In some implementations, the item type may be used to direct the identification process. For example, if the type for the item shown in the content is a brush, the key object identification can focus on identifying bristles or handle as the key object. The key objects associated with particular item types can be specified via a configuration such as a physics configuration provided to the physics engine 1200.

Where the content includes video content, the key object may be identified using object recognition analysis of the images included in the video content. This analysis may be similar to the analysis performed for image content discussed above. In some implementations, the key object may be identified by identifying one or more locations within the video content that change between the images included in the video content. For example, a location may be identified such as described with reference to FIG. 10 above. Once the location 1055 is identified, the object detection may be performed to detect objects within the video content at the location 1055 rather than processing the entire frame of video content. Motion detection, such as described with reference to FIG. 11 may be used in addition or as an alternative for identifying the key object.

In some implementations, the content enhancement workstation 170 may identify or assist in the identification of the key object. In such implementations the content enhancement workstation 170 may generate and present an interface displaying the content. The interface may also include control elements to allow selection of an area of the content including the key object. For example, the control element may include a selection tool (e.g., lasso, circle selector, bounding box selector, etc.) that can be used to identify the area around a key object. Upon receiving the selection, such as via an input device coupled with the content enhancement workstation 170, the selection may be transmitted to the content enhancement engine 1700 for further processing. The area may identify the key object or provide assistance to the detection of the key object by identifying a smaller portion of the content to search for the key object.

At block 1315, a physics property may be detected for the key object. The physics property may be detected based on the identification of the key object. For example, if the key object was identified as a button for an electronic device, a physics property of the button may be the sound the button makes when pressed or the amount of pressure needed to activate the button. If the item is a clothing item, the physics property may include the fabric type for the item. The fabric type may be associated with an elasticity. The more elastic the fabric is, the faster the item would return to a resting state. The physical properties may be associated with item information maintained by the catalog system 110. In such implementations, the physics modeling unit 1215 may query the catalog system 110 to obtain the physical properties of an item using an identifier for the item shown in the content. As discussed above, detection of the physics property may include receiving physics data from an item physics sensor such as the item physics sensor 175 shown in FIG. 1.

At block 1320, a determination is made as to whether the content includes audio content. The determination may be based on metadata for the content received such as file name, file extension, or file properties. The physics configuration may include a list of metadata and associated audio content determinations. For example, if the file extension of the file including the content is WAV the content is likely to include audio content.

If the determination at block 1320 is affirmative, at block 1325, the audio content is extracted from the content. For example, where the content received for modeling is video content, the audio content may be separated from the image content. This allows modeling of the audio content separately from the image content. A codec may be included to decode the audio portion of the content and encode an audio only file.

Once the audio content is obtained, at block 1330, audio physics model may be generating based at least in part on one or more of the audio and the physics property of the key object. One way the audio content may be modeled is by providing haptic feedback corresponding to the audio content. For example, if the key object makes a sharp sound such as a button snapping or a pop when a kitchen container opens, the sharpness may be simulated by causing haptic feedback synchronized with the audio content at the point of the sharp sound. The timing of when to present the haptic feedback as well as a quantity of haptic feedback to provide may be specified via the audio physics model. To identify the sound and generate modeled output, the waveform of the audio may be analyzed. One example will be described below with reference to FIG. 14.

As another example, where the key object is shown in the content is under high friction, the audio content may include audio data for the scraping that typically accompanies a high friction activity. Based on the analysis of the waveform of the audio content the friction may be used to oscillate display of the image content at a frequency that corresponds to the friction to provide a visual representation of the physical property of the key object shown. The quantity and frequency of the oscillation may be included in the audio physics model.

Figure 14:
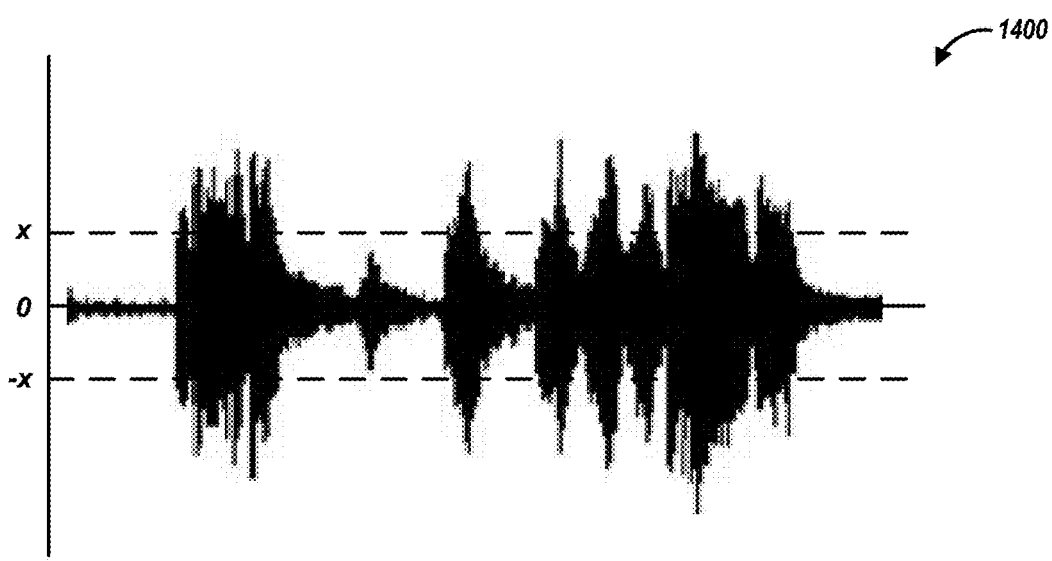
FIG. 14 is a graph diagram depicting an example waveform of audio content related to the item and thresholds for haptic feedback that may be used by the physics engine to generate the physics model.

FIG. 14 is a graph diagram depicting an example waveform of audio data for sound captured for the item and thresholds for haptic feedback that may be used by the physics engine to generate the physics model. As discussed above, the physics model may include an audio physics model. FIG. 14 includes a waveform 1400 for audio data obtained from audio content. In the example of FIG. 14, the audio physics modeling is performed based on thresholds shown as x and −x. The value of the thresholds may be specified in the physics configuration. The thresholds may identify a decibel level above which haptic feedback will be triggered. Accordingly, for at a time where the waveform 1400 exceeds the threshold, the audio physics model may include information to generate an output such as a haptic output.

In addition to identifying when to initiate the output, the analysis of the waveform 1400 in contrast to the threshold may also provide a quantity of output to provide. For example, the quantity of haptic output provided for a peak may be directly correlated with a difference between the peak and the threshold. In such implementations, louder sounds may be represented with more haptic output.

The audio physics modeling for the waveform 1400 may also indicate a duration for the output. For example, if the waveform 1400 includes a steady sound, such as an alarm clock tone, the output may be continued until the end of the tone.

The physics property of the key object may be used to for audio physics modeling. For example, if the key object is elastic, the speed with which a rubber band would snap back is faster than the pop of a kitchen container as the vacuum seal is released. Accordingly, the duration for the output as specified in the audio physics model may be adjusted based on the physics property of the key item.

After generating the audio physics model at block 1330 or if the determination at block 1320 is negative, at block 1335 a determination is made as to whether the content representing the item being modeled includes video.

The determination may be based metadata for the content received such as file name, file extension, or file properties. The physics configuration may include a list of metadata and associated video content determinations. For example, if the file extension of the file including the content is AVI the content is likely to include video content.

If the determination is no, at block 1355, any models generated by the process 1300 are stored in association with the content. The models may include an audio physics model generated at block 1330. The models may be stored in a physics model storage such as the physics model storage 1295 shown in FIG. 12. In some implementations, the models may be stored in association with an identifier for the item or key object shown in the content.

Returning to block 1335, if it is determined that the content includes video content, at block 1340, the video images are extracted from the content. For example, the audio content may be separated from the images included in video content. This allows modeling of the item as represented in the audio content separately from the representation of the item via the images. A codec may be included to decode the image portion of the content and encode an image only file.

At block 1345, key object movement in the video content may be detected. The movement may be detected using optical flow such as described above with reference to FIG. 11. Movement may be detected by comparing two or more images extracted from the content. In such implementations, an initial location of the key object shown in a first image may be identified. A subsequent location of the key object may be identified in a second image. By comparing the initial location with the subsequent location, the movement of the key object can be determined (e.g., interpolated between the initial location and the subsequent location).

At block 1350, a video physics model may be generated using video images, key object movement, and a physics property of the key object. For example, consider video content of a zipper being unzipped. At the start of the video content, the zipper is fastened and as the video content is played back, the zipper is unfastened to an ending location shown in a final frame of the video content. Physical properties may be directly correlated with user interactions specified in the video physics model. For example, physical properties of the zipper may include how tight the zipper teeth clasp. This may correspond to a zipper requiring more force to unzip than a looser zipper. Physical properties may be inversely correlated with user interactions specified in the video physics model. For example, physical properties of the zipper may include the elasticity of the fabric near the zipper. If the fabric is stiff, as the zipper unzips, the surrounding fabric may not move as quickly as a softer, suppler material. The tightness and/or elasticity of the key object can be modeled by how quickly the video content is played back. As part of generating the video physics model, the playback may be correlated with an interaction calibrated to simulate the physics property of the zipper. For example, the magnitude of interaction needed via an access device (e.g., touchscreen) to cause playback of the video content may be proportional to the force needed to unzip the zipper of the physical item.

Figure 15:
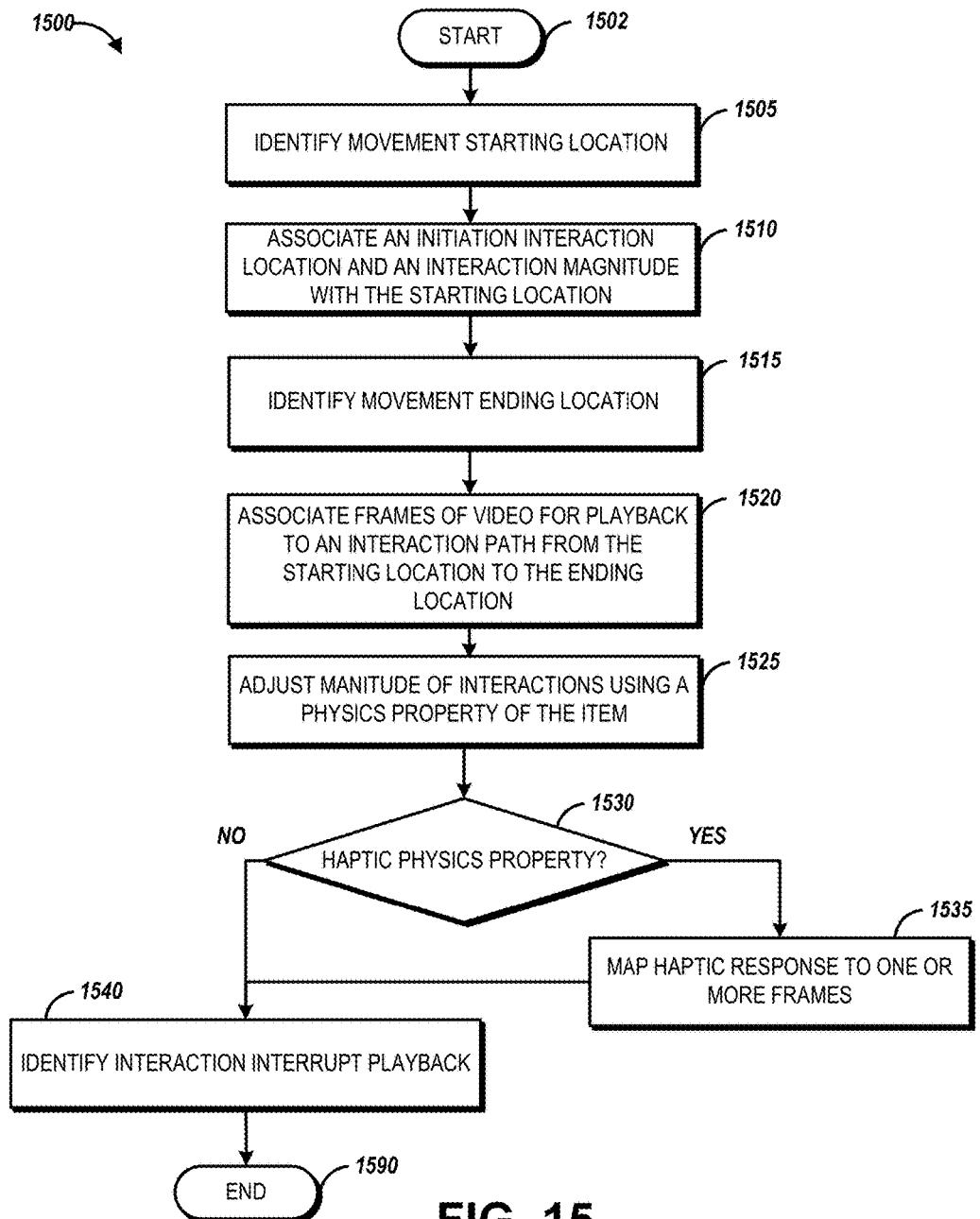
FIG. 15 is a flow diagram depicting an illustrative routine executed by the physics engine for mapping interactions to portions of the content.

FIG. 15 is a flow diagram depicting an illustrative routine executed by the physics engine for associating interactions with portions of the content showing the item modeled by the physics model for simulating a physics property of the item. The process 1500 shown in FIG. 15 illustrates how the physics modeling unit 1215 may generate a video physics model for content to represent the physics property of the item. The process 1500 in FIG. 15 illustrates how interactions such as touch, click, eye tracking, etc. are associated with playback of the video content. While the interactions may be with a representation of the item via an access device, the interactions may simulate a physical interaction with the item.

The process 1500 shown in FIG. 15 may be implemented in whole or in part by a physics engine such as discussed in FIGS. 1 and 12 above. Certain aspects of the process 1500 may be implemented by the physics modeling unit 1215 of a physics engine. In some implementations, aspects of the process 1300 may be implemented by or in conjunction with a content enhancement workstation such as shown in FIG. 1 and discussed above.

The generation of the video physics model begins at block 1402. The process 1500 assumes video content showing an item is provided for modeling. At block 1405, a starting location for the movement of the key object is identified. In some implementations, the identification may include object recognition of the key object in an initial frame of the video content. The key object recognition may be based on one or more of an analysis of the pixels in the initial frame or segmentation of the video frame. The identification may be provided by or assisted by information provided by the content enhancement workstation 170. For example, the content enhancement workstation 170 may receive the video content and present an interface for selecting an area of the video content showing the key object.

The starting location identified at block 1405 represents where a user interaction with the content should begin to activate the playback of the content. At block 1410, an initiation interaction location and magnitude are associated with the starting location. The interaction magnitude may indicate how vigorous the interaction must be to initiate the playback. The magnitude, as discussed above, can represent stiffness of a feature such as a zipper or button. It may be desirable to include a minimum threshold interaction magnitude. This can avoid triggering playback based on errant interactions.

Having determined where within the content for the item being modeled and how much interaction at the initiation location is needed to activate playback of the content, at block 1515, an ending location for the movement of the key object is identified. In some implementations, the identification may include object recognition of the key object in a frame at the end of the video content (e.g., the last frame showing the item). The key object recognition may be based on one or more of an analysis of the pixels in the video frame or segmentation of the video frame. The interaction initiation location or magnitude may be identified based on physics properties detected by an item physics sensor such as the item physics sensor 175 of FIG. 1.

At block 1520, frames of the video content are associated with an interaction path from the starting location to the ending location. The association models the location of the interaction along the path of movement to a frame of the video content. For example, when a finger swipe is defined as the interaction with a zipper, as the finger swipe is dragged to a location half way between the starting location and the ending location, the video content should have a playback position of a frame of video information showing the half-unzipped zipper. In this way, the interaction with the video content is correlated with playback to show the item in an expected state had the user interacted with the physical item (e.g., half-unzipped). In some implementations, the content enhancement workstation 170 may present an interface for receiving information identifying the interaction path. For example, the interface may present a static image of a frame of video content. The interface may include a control element (e.g., button, link, etc.) to activate capturing of an interaction for the content. Once activated, the content enhancement workstation 170 may record interactions such as selections, swipes, sound, movement, etc. with the content. The recorded interactions may then be associated with the initiation interaction for the content.

At block 1525, the magnitude of the interactions (e.g., the initiation interaction or the interactions along the interaction path) may be adjusted to further model a physics property of the key object. For example, consider a two-phase locking lid for a mug. An initial interaction may require a first magnitude touch interaction to seat the lid. Once seated, a second magnitude touch interaction may be specified to simulate the second locking phase. The playback of video content showing such a lid may stop playback after video frames showing the first phase are presented until the second magnitude touch interaction is detected. In this way, a user can "experience" the two-phase locking via an access device. The magnitude may be adjusted based on physics properties detected by an item physics sensor such as the item physics sensor 175 of FIG. 1.

At block 1530, a determination is made as to whether haptic output may be provided for the physics property. The determination may be based on the physics configuration whereby the generation of haptic output is specified via the physics configuration for certain access devices, access device types, items, key objects, physics property, or other information detectable within the system. The determination may be performed based on functional characteristics of the access device that will be receiving the physics. For example, if the access device has no haptic capabilities, it may be desirable to preserve resources and omit generating haptic output information.

If the determination at block 1530 is affirmative, at block 1535, a haptic output is associated with one or more frames of video content. In the example of the two-phase locking lid, it may be desirable to provide a haptic vibration at the end of the first phase. In such implementations, the haptic output may be associated with the playback location showing the lid at the end of the first phase of closure. This haptic "bump" can further simulate the closing of the lid. Haptic output associated with the video content may include information indicating a property of the haptic output to provide at the associated frame of video content. The information may indicate one or more of the pattern of the haptic output, the strength of haptic output, and duration for the haptic output.

After associating the haptic output at block 1535 or if the determination at block 1530 is negative, at block 1540 an interaction interrupt playback is identified. For some items, if a user stops interacting with the key object, the key object may stay in place. For example, when unzipping a zipper, in the physical world, if the process is left half completed, the zipper typically stays in half completed state. For some items, if a user stops interacting with the key object, it may be a more accurate representation of the physical item for the key object to move to another location. For example, consider a button-down shirt. In the physical world, if the collar of the shirt is moved aside to view inside the shirt, if the collar is released, it will typically return to the closed state, hiding the inside of the shirt. To model this interaction, an interrupt playback behavior is identified whereby if a user stops interacting with the collar, the playback may rewind to show frames of video content reversing the collar to the show a frame with a closed view of the shirt.

Identifying the interaction interrupt playback may also include identifying a speed for playback. For example, when simulating a physics property of a shirt, if the material forming the shirt is soft, the speed at which the collar of the physical shirt would return to the closed position is slower than for a stiffer fabric. As such, the playback upon detecting an interaction disruption may be adjusted based on a physical attribute of the key object. At block 1590, the process 1500 ends.

Returning to FIG. 13, at block 1355, the video physics model generated at block 1350 may be stored in association with the content provided for physics modeling at block 1305. The video physics model may be stored in a physics model storage such as the physics model storage 1295 shown in FIG. 12. The process 1300 ends at block 1390 but may be repeated to generate another physics model for the received at block 1305 content or different content subsequently received.

Returning to FIG. 12, the physics models storage 1295 may be specifically architected to efficiently store and retrieve physics models for identified content. In some implementations, the physics models may be stored in association with an identifier for the content. In such implementations, the physics models storage 1295 may be indexed using the identifiers to expedite retrieval of the physics model associated therewith. In some implementations, the models may be stored in association with an identifier for the item or key object shown in the content.

The physics engine 1200 may generate the physics model for an item shown in content before a request for the content from an access device is received. For example, the catalog system 110 may receive new content showing an item. In some implementations, it may be desirable to generate the physics model such that the physics model is ready when a request for the model is received. Because the physics model storage 1295 includes a physics model for the content, the responding to the request may not require generating the physics model at the time of the request.

Whether the physics model is generated prior to receiving a request from an access device or in real-time, responsive to a request from an access device, physics modeling information to configure the access device 200 (or the item physics engine 226 associated therewith) to present the features represented may be generated by the physics simulation generator 1220. In the implementation shown in FIG. 12, the physics simulation generator 1220 is implemented as instructions residing in the memory 1250 that, when executed, cause the physics engine 1200 to perform the functions described. In some implementations, the physics simulation generator 1220 may be implemented as a hardware device (e.g., circuit) configured to perform the functions described.

The physics simulation generator 1220 may receive a physics model as an input. In some implementations, the input may indirectly reference a physics model such as by content identifier or item identifier which can be used by the physics simulation generator 1220 to obtain the physics model such as from the physics model storage 1295. The physics simulation generator 1220 may provide a machine readable configuration to adjust the access device 200 and/or the item physics engine 330 to simulate a physics property of the item shown in the content. The configuration may include modeling information such as the type of output (e.g., image, audio, haptic, etc.), location of user interactions, magnitude of user interactions, etc. The physics simulation generator 1220 may obtain the physics model for the item and generate the configuration. In some implementations, the type of interaction may also be specified via the configuration (e.g., touch, drag, click, tap, etc.).

In some implementations, it may be desirable to tailor the physics modeling information generated by the physics simulation generator 1220 using the physics model to the access device that will be presenting the content. An access device detector 1225 may be included to receive and/or detect the access device information. Similar to the access device detector 325 shown in FIG. 3 or the access device detector 725 shown in FIG. 7, the access device detector 1225 may be configured to detect functional characteristics of an access device such as display dimensions, display orientation, an identifier for an application being used to display the enhanced content, identifier of the item physics engine 230 associated with the access device 200, resource level for the access device (e.g., power, network bandwidth, processor bandwidth, memory, etc.), and the like.

The access device detector 1225 shown in FIG. 12 is implemented as instructions residing in the memory 1250 that, when executed, cause the physics engine 1200 to perform the functions described. In some implementations, the access device detector 1225 may be implemented as a hardware device (e.g., circuit) configured to perform the functions described.

The access device detector 1225 may detect functional characteristics based on a received request for a physics model. The request may include header information or other metadata providing information about the access device 200, application of the access device that generated the request, and resources (e.g., network type) available to the access device 200. In some implementations, the request may be submitted to the content enhancement engine 1700 on behalf of the access device 200. For example, the catalog system 110 may receive a request from the access device 200. As part of generating a response to the request, the catalog system 110 may transmit a request for a physics model for an item shown in enhanced content stored in the item data store 126. The catalog system 110 may receive the physics model or information for retrieving the physics model and provide this to the access device 200. In some implementations, the request for the physics model may indicate the delivery of the physics model from the content enhancement engine 1700 to the access device 200. In such implementations, transmission details (e.g., IP address, protocol, security token, authentication information, encryption, etc.) may be provided in the request from the catalog system 110 to specify how and where the physics model should be delivered. In some implementations, the access device detector 1225 may provide the functional characteristics detected for the access device as an output. For example, a message including the functional characteristics detected may be provided to the physics simulation generator 1220 to tailor the output of the physics simulation generator 1220 based on the functional characteristics.

In some implementations, the access device detector 1225 may obtain additional information about the access device 200. The additional information may be obtained using information about the access device 200 included in the request such as a device identifier or username. Based on this information, the access device 200 information can be retrieved. In some implementations, the information may be retrieved from the access device 200 based on a request from the access device detector 1225 transmitted to the access device 200. The request may include the information elements the access device detector 1225 is seeking. In some implementations, this information may be included as part of session initiation (e.g., session initiation protocol session; real time transport protocol session) between the access device 200 and the content enhancement engine 1700.

In some implementations, the access device detector 1225 may obtain functional characteristics of an access device from the catalog system 110. For example, the catalog system 110 may request the physics model and include them in a response to the access device 200. In such implementations, the catalog system 110 may store information about the access device 200 and/or its user. Such information may be provided to the access device detector 1225 as part of the request message that initiates the generation of the physics model. In some implementations, the access device detector 1225 may request this information from the catalog system 110.

In some implementations, the access device detector 1225 may identify a service provider for the access device 200. The service provider may be, for example, an internet service provider or wireless service provider. The service provider may present an interface to service requests for access device functional characteristics. In some implementations, the access device detector 1225 may provide information about the access device (e.g., IP address, device identifier, etc.) in a message requesting additional access device functional characteristics. In response, the service provider may provide all or some of the requested information.

In some implementations, the service provider may provide information to help control the flow of traffic through its network. As such, the service provider may provide information about the traffic that may be permitted for an access device rather than specific details about a particular access device. This may include the types of content that can be received by the access device 200, limits on the quantity of content that can be received by the access device 200, network speed for the access device 200 (e.g., 3G, 4G, LTE, enhanced LTE, Wi-Fi, etc.), whether the access device 200 is roaming, and the like. This information can be used by the physics engine 1200 to identify what types and quantities of physics models may be provided to and/or rendered by the access device 200.

The physics engine 1200 may further include a power source 1280. The power source 1280 may include a wired or wireless source of power sufficient to supply operational power to the elements described. In some implementations, the power source 1280 may include a battery or other rechargeable source. In some implementations, the power source 1280 may include a solar panel array.

The elements of the physics engine 1200 are coupled by a bus 1290. The bus 1290 is configured to allow the elements to exchange data (such as the messages described herein) and/or power. In some implementations, parallel busses may be included, one for data and one for power.

In some implementations, the physics engine 1200 may include a non-transitory computer-readable memory configured to store executable instructions. The memory 1250 may be configured for this purpose. In such a configuration, the physics processor unit 1240 may be in data communication with the computer-readable memory storing the executable instructions. The physics processor unit 1240 may be programmed by the executable instructions to implement the features described.

Figure 16:
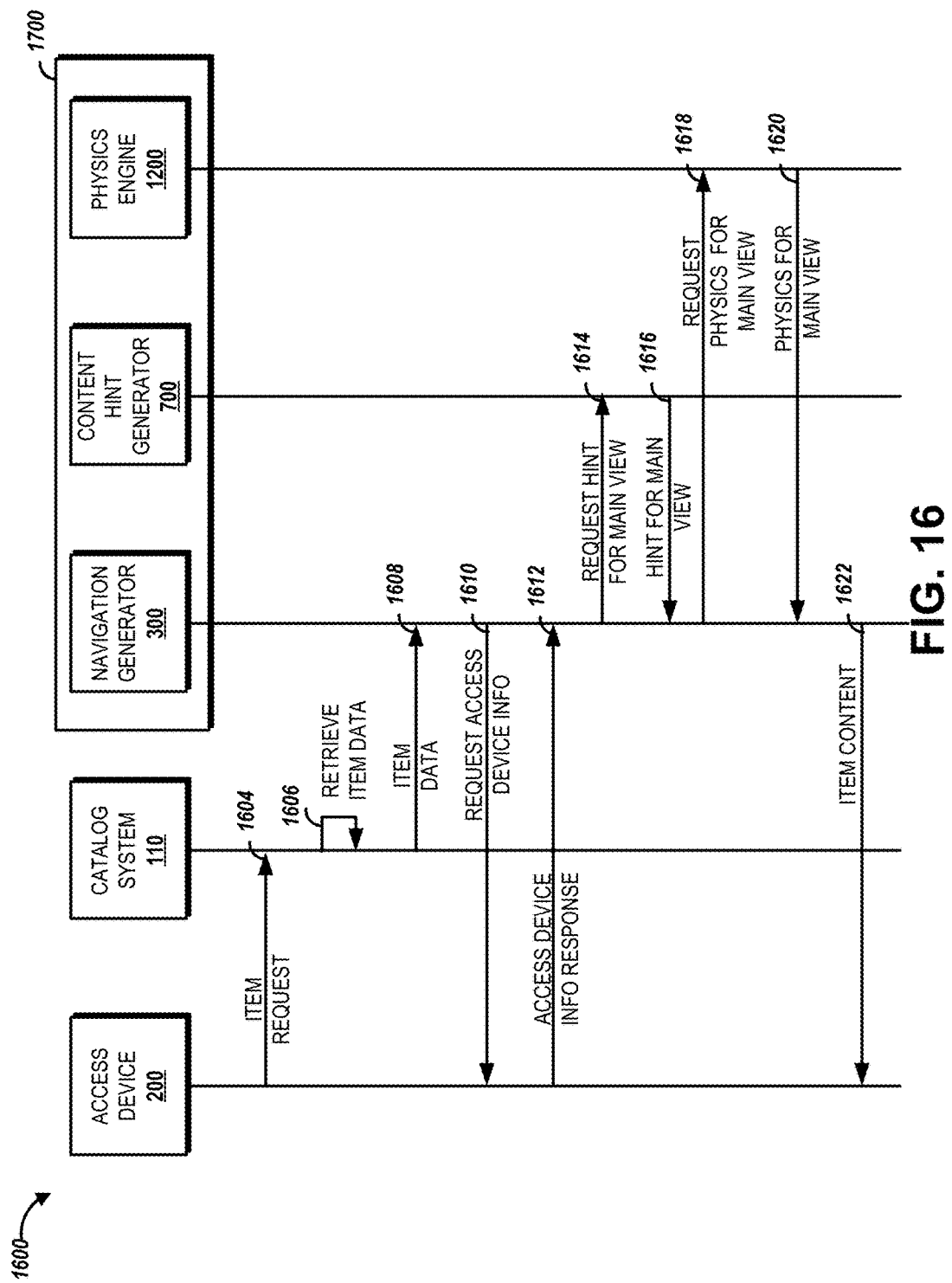
FIG. 16 is a schematic diagram of messages that may be sent between components of the content enhancement engine during an example item browsing session.

FIG. 16 is a schematic diagram of messages that may be sent between components of the content enhancement engine during an example item browsing session. The messages shown in FIG. 16 include messages exchanged between exemplary entities selected to highlight certain features related to requesting and generating enhanced content. The messages shown in FIG. 16 illustrate how the content enhancement engine 1700 may provide enhanced content and hints to the access device 200. It will be understood that fewer or additional entities may be included to achieve a similar result.

An item request message 1604 may be transmitted from the access device 200 to the catalog system 110. The item request message 1604 may include an identifier for an item or query terms that can be used to identify the item. The item request message 1604 may include information identifying the access device 200.

Via message 1606, the catalog system 110 may retrieve item data using the information included in the item request message 1604. The item data may be retrieved from the item data store 126. The item data may include descriptive information for the item (e.g., title, manufacturer, launch date, user reviews, etc.). In some implementations, the item data may include content showing the item.

The item data may be provided in a message 1608 to the content enhancement engine 1700, such as via the navigation generator 300 as shown in FIG. 16. The message 1608 may include the content or references to the content identified by the catalog system 110. The message 1608 may request generation of a navigation interface for the content showing the item. Generating the navigation include may include the process 500 shown in FIG. 5.

To tailor the content and/or hints, message 1610 may be transmitted to the access device 200. The message 1610 may request functional characteristics for an access device. The message 1610 may include a request for functional characteristics such as display dimensions, display orientation, an identifier for an application being used to display the interface, resource level for the access device (e.g., power, network bandwidth, processor bandwidth, memory, etc.), and the like. Message 1612 may be received by the navigation generator 300. The message 1612 may include the functional characteristics provided by the access device 200. Once received by the content enhancement engine 1700, the functional characteristics may be provided to one or more of the navigation generator 300, the content hint generator 700, and/or the physics engine 1200 to tailor the respective outputs for the access device 200.

The navigation generator 300 may request, via message 1614, a hint for a main view identified while generating the navigation interface. The content hint generator 700 may generate the hint via the process 900 shown in FIG. 9. The hint may be provided to the navigation generator 300 via message 1616.

As shown in FIG. 16, the navigation generator 300 may also request a physics model for an item shown in the main view via message 1618. The physics model may be generated by the process 1300 shown in FIG. 13 and/or the process 1500 shown in FIG. 15. The physics model may be provided in a response message 1620. In some implementations, the content enhancement engine 1700 may include a processor (not shown) to coordinate the requests (e.g., message 1614 and message 1618) for the content hint generator 700, and the physics engine 1200.

Via message 1622, the item content is provided to the access device 200. The item content may include the navigation interface including a main view with hinting information. Enhanced content corresponding to the main view may also be provided that simulates the item shown in the enhanced content.

Figure 17:
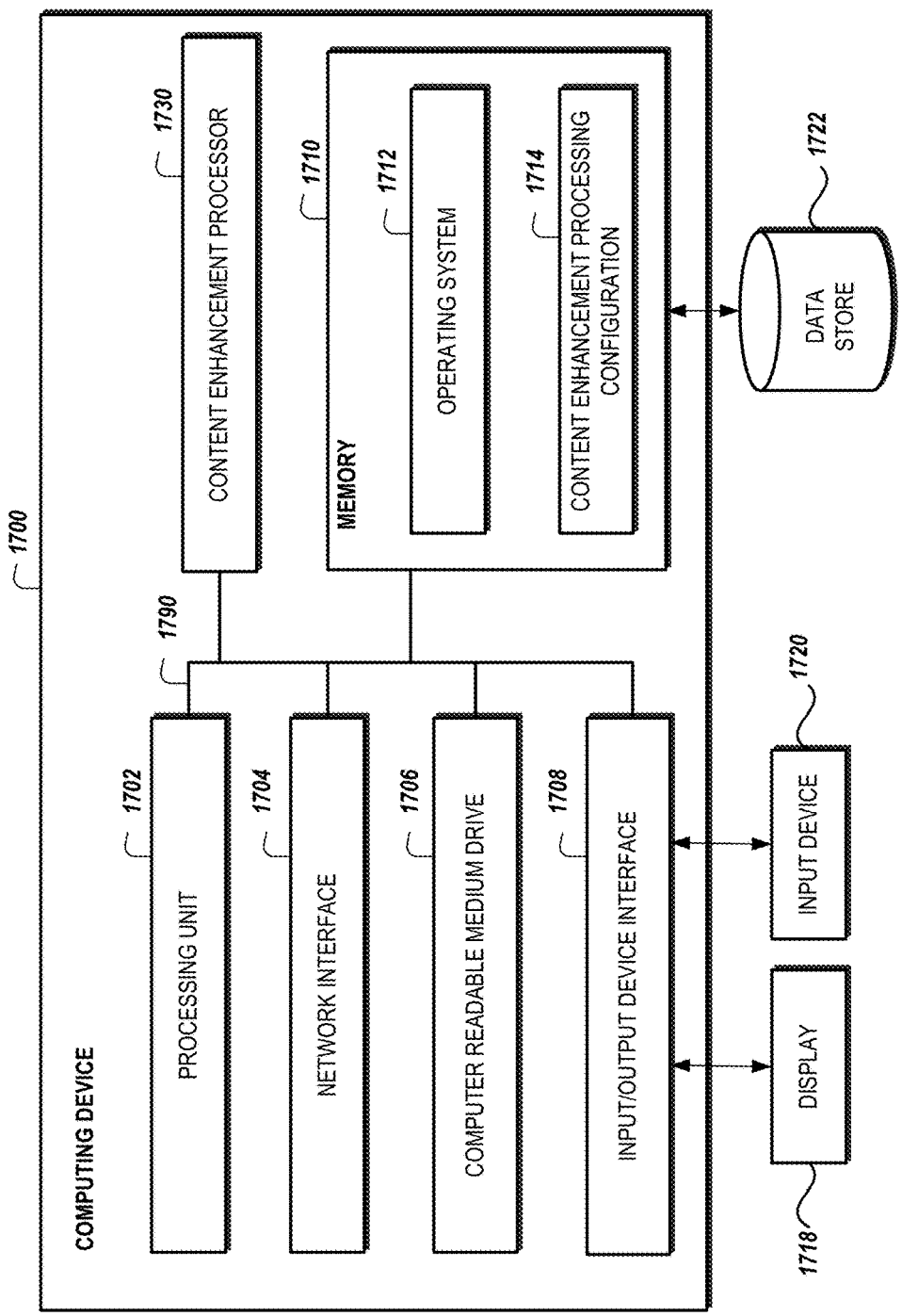
FIG. 17 is a block diagram depicting an illustrative computing device that can implement the content enhancement engine shown in FIG. 1.

FIG. 17 is a block diagram depicting an illustrative computing device that can implement the content enhancement engine shown in FIG. 1. The computing device 1700 can be a server or other computing device, and can comprise a processing unit 1702, a content enhancement processor 1730, a network interface 1704, a computer readable medium drive 1706, an input/output device interface 1708, and a memory 1710. The network interface 1704 can provide connectivity to one or more networks or computing systems. The processing unit 1702 can receive information and instructions from other computing systems or services via the network interface 1704. The network interface 1704 can also store data directly to memory 1710. The processing unit 1702 can communicate to and from memory 1710 and output information to an optional display 1718 via the input/output device interface 1708. The input/output device interface 1708 can also accept input from the optional input device 1720, such as a keyboard, mouse, digital pen, microphone, mass storage device, etc.

The memory 1710 contains computer program instructions that the processing unit 1702 executes in order to implement one or more embodiments. The memory 1710 may include RAM, ROM, and/or other persistent, non-transitory computer readable media. The memory 1710 can store an operating system 1712 that provides computer program instructions for use by the processing unit 1702 or other elements included in the computing device in the general administration and operation of the computing device 1700. The memory 1710 can further include computer program instructions and other information for implementing aspects of the present disclosure.

For example, in one embodiment, the memory 1710 includes an indirect content enhancement processing configuration 1714. The content enhancement processing configuration 1714 may include the thresholds, navigation configuration, catalog system location (e.g., URL), content hind configuration, physics configuration, automatic speech recognition system, and other configurable parameters to dynamically adjust the content enhancement processor 1730 and/or the computing device 1700 to process item requests and generate enhanced content and interfaces as described above. The content enhancement processing configuration 1714 may store specific values for a given configuration element. For example, the specific threshold value may be included in the content enhancement processing configuration 1714. The content enhancement processing configuration 1714 may, in some implementations, store information for obtaining specific values for a given configuration element such as from a network location (e.g., URL).

The memory 1710 may also include or communicate with one or more auxiliary data stores, such as data store 1722. The data store 1722 may electronically store data regarding the composite images, extracted images, extraction comparisons for specific item types, authorization verdicts, and the like.

The elements included in the computing device 1700 may be coupled by a bus 1790. The bus 1790 may be a data bus, communication bus, or other bus mechanism to enable the various components of the computing device 1700 to exchange information.

In some embodiments, the computing device 1700 may include additional or fewer components than are shown in FIG. 17. For example, a computing device 1700 may include more than one processing unit 1702 and computer readable medium drive 1706. In another example, the computing device 1702 may not be coupled to a display 1718 or an input device 1720. In some embodiments, two or more computing devices 1700 may together form a computer system for executing features of the present disclosure.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a content enhancement system or other hardware included in a content enhancement system. The content enhancement system or other hardware included in a content enhancement system may include a digital signal processor (DSP), an application specific integrated circuit (ASIC), a field programmable gate array (FPGA), a microprocessor, a controller, microcontroller, or other programmable logic element, discrete gate or transistor logic, discrete hardware components, or any combination thereof. For such content enhancement systems, devices used to implement the system are specially designed to perform the content collection, detection, and enhancements described herein. A content enhancement system may include electrical circuitry configured to process specific computer-executable to perform one or more of the features described herein. In embodiments where the content enhancement system includes a FPGA or similar programmable elements, the content enhancement system may provide one or more of the features described processing without processing computer-executable instructions but instead by configuring the FPGA or similar programmable element to perform the recited features. Although described herein primarily with respect to digital technology, a content enhancement system may also include primarily analog components. For example, some or all of the content enhancement processing features described herein may be implemented in analog circuitry or mixed analog and digital circuitry.

The elements of a method, process, routine, or algorithm described in connection with the embodiments disclosed herein can be embodied directly in content enhancement system hardware, in a software module executed by a device included in the content enhancement system, or in a combination of the two. A content enhancement software module can reside in RAM memory, flash memory, ROM memory, EPROM memory, EEPROM memory, registers, hard disk, a removable disk, a CD-ROM, or similar form of a non-transitory computer-readable storage medium. An exemplary storage medium can be coupled to the content enhancement system such that the content enhancement system can read information from, and write information to, the storage medium. In the alternative, the storage medium can be integral to the content enhancement system. The content enhancement system and the storage medium can reside in an ASIC. The ASIC can reside in a device configured to capture or process data such as a microphone, a smartphone, a set-top-box, a tablet computer, a desktop computer, or the like. In the alternative, the content enhancement system and the storage medium can reside as discrete components (e.g., sub-system) in a device configured to collect, detect, and enhance content as described herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), Flash, Java, .net, web services, and rich site summary (RSS). In some implementations, a UI may be included in a stand-alone client (for example, thick client, fat client) configured to communicate (e.g., send or receive data) in accordance with one or more of the aspects described.

Aspects of the disclosure describe pixel processing. Pixels may represent visual information in two dimensions. In some implementations, these aspects may also be applied for voxel processing. Voxels may represent visual information in three dimensions. For example, the physics model may provide simulate a physics property of an item in a three dimensional space such as experienced via an augmented reality or virtual reality system. Whether processing pixels or voxels, the information represented by the pixel of voxel may include color information including grayscale or black/white implementations without full-spectrum color. In some implementations, the pixel or voxel may be associated with depth information.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:

1. A computer-implemented method comprising:
    under control of a computing device executing specific computer-executable instructions,
    receiving, from a display device, a request for a content including an item;
    retrieving, from an item data storage, a first image including the item and a second image including a portion of the item also included in the first image;
    determining that an amount of the item included in the first image exceeds an amount of the item included in the second image;
    identifying the first image as an overview image and the second image as a detailed image;
    detecting a region within the overview image corresponding to the portion of the item included in the detailed image, wherein the detecting is based at least in part on a comparison of first pixel information for the region in the overview image with second pixel information for the detailed image;
    causing display of the overview image via the display device; and
    causing display of an interactive control element identifying the region of the overview image via the display device, wherein the interactive control element, when activated, causes display of the detailed image.

2. The computer-implemented method of claim 1, further comprising:
    detecting an interaction with the interactive control element, the interaction indicating at least one of a type of interaction or a quantity of interaction;
    determining the interactive control element has been activated based at least in part on a comparison of the type of interaction or quantity of interaction with an activation threshold; and
    causing display of the detailed image in place of the overview image.

3. The computer-implemented method of claim 1, further comprising:
    generating preview image of the detailed image, wherein the dimensions of the preview image are smaller than the dimensions of the detailed image;
    causing display of the preview image for concurrent viewing with the overview image;
    detecting an interaction with the preview image; and
    adjusting the visibility of the interactive control element based at least in part on the interaction.

4. The computer-implemented method of claim 1, further comprising:
    receiving the request from an access device; and
    detecting a functional characteristic of the access device using information included in the request,
    wherein the functional characteristic is one of: display dimensions, display orientation, an identifier for an application being used for display, or level of a resource for the access device, and
    wherein retrieving the first image and the second image is based at least in part on the functional characteristic of the access device, wherein the first image and the second image can be received and displayed by the access device associated with the functional characteristic.

5. A computer-implemented method comprising:
    under control of a computing device executing specific computer-executable instructions,
    receiving, from a display device, a request for a content including an item;
    retrieving, from an item data storage, a first content including the item and a second content including a portion of the item also shown in the first content;
    identifying a region in the first content corresponding to the portion of the item included in the second content based at least in part on a comparison of first pixel information for the region in the first content with second pixel information for the second content; and
    causing display of the first content and an interactive control element for the second content via the display device, wherein the interactive control element for the second content denotes the region in the first content corresponding to the portion of the item included in the second content.

6. The computer-implemented method of claim 5, wherein receiving the request for a content including the item comprises receiving a message from an access device, the message including information identifying the item, and wherein retrieving the first content and the second content comprises:
    querying a catalog system using the information identifying the item; and
    receiving at least one of the first content and the second content in response to the querying.

7. The computer-implemented method of claim 5, wherein identifying the region in the first content corresponding to the portion of the item included in the second content comprises:
    identifying pixels in the first content corresponding to the pixels in the second content by comparing an image feature included in the second content with the image feature included in the first content,
    wherein the image feature is identified by at least one of:
        color information;
        color gradient location information;
        color gradient orientation information; or
        an object recognized in the first content and the second content.

8. The computer-implemented method of claim 5, wherein the computer-implemented method further comprises:

detecting an interaction with the interactive control element, the interaction indicating at least one of a type of interaction or a quantity of interaction;

determining the interactive control element has been activated based at least in part on a comparison of the type of interaction or quantity of interaction with an activation threshold; and causing display of the second content in place of the first content.

9. The computer-implemented method of claim 8, wherein causing display of the second content in place of the first content comprises causing display of a series of images, each image in the series showing less of the item than a previous image in the series, wherein the series of images ends with an image showing the portion of the item shown in the second content.

10. The computer-implemented method of claim 5, further comprising:

generating preview content of the second content, wherein the dimensions of the preview content are smaller than the dimensions of the second content;

causing display of the preview content for concurrent viewing with the first content;

detecting an interaction with the preview content; and adjusting the visibility of the interactive control element based at least in part on the interaction.

11. The computer-implemented method of claim 5, further comprising:

receiving the request via an access device; and detecting a functional characteristic of the access device, wherein retrieving the first content and the second content is based at least in part on the functional characteristic of the access device.

12. The computer-implemented method of claim 11, further comprising:

retrieving a set of content including the first content, the second content and third content;

determining the functional characteristic of the access device is incompatible with the third content; and removing the third content from the set of content.

13. A system comprising:

a data store storing specific computer-executable instructions; and a computing device in communication with the data store, the computing device including a processor that executes the specific computer-executable instructions to cause the system to at least:

receive, from a communication device, a request for a content including an item;

retrieve, from an item data storage, a first content including the item and a second content including a portion of the item also included in the first content;

identify a region in the first content corresponding to the portion of the item included in the second content based at least in part on a comparison of first pixel information for the region in the first content with second pixel information for the second content; and cause display of the first content and an interactive control element for the second content, via the communication device, wherein the interactive control element for the second content denotes the region in the first content.

14. The system of claim 13, wherein the specific computer-executable instructions causing the system to receive the request for a content including the item comprises instructions causing the system to receive a message from an access device, the message including information identifying the item, and wherein the specific computer-executable instructions cause the system to retrieve the first content and the second content by at least:

querying a catalog system using the information identifying the item; and receiving at least one of the first content and the second content in response to the querying.

15. The system of claim 13, wherein the specific computer-executable instructions cause the system to identify the region in the first content by at least:

identifying pixels in the first content corresponding to the pixels in the second content by comparing an image feature included in the second content with the image feature included in the first content, wherein the image feature is identified by at least one of:
color information;
color gradient location information;
color gradient orientation information; or
an object recognized in the first content and the second content.

16. The system of claim 13, wherein the processor executes the specific computer-executable instructions to further cause the system to at least:

detect an interaction with the interactive control element, the interaction indicating at least one of a type of interaction or a quantity of interaction;

determine the interactive control element has been activated based at least in part on a comparison of the type of interaction or quantity of interaction with an activation threshold; and cause display of the second content in place of the first content.

17. The system of claim 16, wherein the specific computer-executable instructions cause the system to cause display of the second content in place of the first content by at least causing display of a series of images, each image in the series showing less of the item than a previous image in the series, wherein the series of images ends with an image showing the portion of the item shown in the second content.

18. The system of claim 13, wherein the processor executes the specific computer-executable instructions to further cause the system to at least:

generate preview content of the second content, wherein the dimensions of the preview image are smaller than the dimensions of the second content;

cause display of the preview content for concurrent viewing with the first content;

detect an interaction with the preview content; and adjust the visibility of the interactive control element based at least in part on the interaction.

19. The system of claim 13, wherein the processor executes the specific computer-executable instructions to further cause the system to at least:

receive the request via an access device; and detect a functional characteristic of the access device, wherein retrieving the first content and the second content is based at least in part on the functional characteristic of the access device.

20. The system of claim 19, wherein the processor executes the specific computer-executable instructions to further cause the system to at least:

retrieve a set of content including the first content, the second content and third content;

determine the functional characteristic of the access device is incompatible with the third content; and remove the third content from the set of content.

* * * * *